US011507804B2

(12) United States Patent
Bichler et al.

(10) Patent No.: US 11,507,804 B2
(45) Date of Patent: Nov. 22, 2022

(54) DEVICE AND METHOD FOR CALCULATING CONVOLUTION IN A CONVOLUTIONAL NEURAL NETWORK

(71) Applicant: COMMISSARIAT A L'ENERGIE ATOMIQUE ET AUX ENERGIES ALTERNATIVES, Paris (FR)

(72) Inventors: Olivier Bichler, Massy (FR); Antoine Dupret, Orsay (FR); Vincent Lorrain, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1002 days.

(21) Appl. No.: 16/097,114

(22) PCT Filed: Apr. 27, 2017

(86) PCT No.: PCT/EP2017/060016
§ 371 (c)(1),
(2) Date: Oct. 26, 2018

(87) PCT Pub. No.: WO2017/186829
PCT Pub. Date: Nov. 2, 2017

(65) Prior Publication Data
US 2021/0232897 A1 Jul. 29, 2021

(30) Foreign Application Priority Data
Apr. 27, 2016 (FR) ..................................... 1653745

(51) Int. Cl.
*G06N 3/04* (2006.01)
*G06N 3/063* (2006.01)

(52) U.S. Cl.
CPC .......... *G06N 3/0481* (2013.01); *G06N 3/049* (2013.01); *G06N 3/063* (2013.01)

(58) Field of Classification Search
CPC .... G06N 3/0454; G06N 3/0481; G06N 3/049; G06N 3/063
See application file for complete search history.

(56) References Cited

U.S. PATENT DOCUMENTS

2017/0169327 A1* 6/2017 Nestler ................ G06N 3/0635
2018/0012107 A1* 1/2018 Xu ....................... G06K 9/6273

OTHER PUBLICATIONS

Serrano-Gotarredona et al., "ConvNets Experiments on SpiNNaker", May 27, 2015, 2015 IEEE International Symposium on Circuits and Systems (ISCAS), pp. 2405-2408 (Year: 2015).*

(Continued)

*Primary Examiner* — Brent Johnston Hoover
(74) *Attorney, Agent, or Firm* — BakerHostetler

(57) ABSTRACT

A processor for computing at least one convolution layer of a convolutional neural network is provided, in response to an input event, the convolutional neural network comprising at least one convolution kernel, the convolution kernel containing weight coefficients. The processor comprises at least one convolution module configured to compute the one or more convolution layers, each convolution module comprising a set of elementary processing units for computing the internal value of the convolution-layer neurons that are triggered by the input event, each convolution module being configured to match the weight coefficients of the kernel with certain at least of the elementary processing units of the module in parallel, the number of elementary processing units being independent of the number of neurons of the convolution layer.

14 Claims, 23 Drawing Sheets

(56) References Cited

OTHER PUBLICATIONS

Galluppi et al., "A Hierachical Configuration System for a Massively Parallel Neural Hardware Platform", May 17, 2012, CF'12, pp. 183-192 (Year: 2012).*

Fukushima, "Neocognitron: A Self-Organizing Neural Network Model for a Mechanism of Pattern Recognition Unaffected by Shift in Position", Biological Cybernetics, vol. 36, Issue 4, pp. 193-202, Apr. 1980.

Ciresan, et al., "Flexible, High Performance Convolutional Neural Networks for Image Classification", Proceedings of the Twenty-Second international joint conference on Artificial Intelligence—vol. Two, pp. 1237-1242, Jul. 16-22, 2011.

Mesa, et al., "An Event-Driven Multi-Kernel Convolution Processor Module for Event-Driven Vision Sensors", Solid-State Circuits, 47(2), pp. 504-517, (2012).

Merolla, et al., "A million spiking-neuron integrated circuit with a scalable communication network and interface", Science, 345 (6197), pp. 668-673, Aug. 8, 2014.

Serrano-Gotarredona, et al., "ConvNets experiments on SpiNNaker", 2015 IEEE International Symposium on Circuits and Systems (ISCAS), pp. 2405-2408, May 1, 2015.

Galluppi, et al., "A hierachical configuration system for a massively parallel neural hardware platform", Proceedings of the 9th conference on Computing Frontiers, pp. 183-192, May 15, 2012.

Pérez-Carrasco, et al., "Mapping from Frame-Driven to Frame-Free Event-Driven Vision Systems by Low-Rate Rate Coding and Coincidence Processing—Application to Feedforward ConvNets", IEEE Transactions on Pattern Analysis and Machine Intelligence, vol. 35, Issue: 11, pp. 2706-2719, Apr. 10, 2013.

\* cited by examiner

|   | 0 | 1 | 2 | 3 | 4 | 5 |
|---|---|---|---|---|---|---|
| 0 | 0 | 1 | 2 | 0 | 1 | 2 |
| 1 | 3 | 4 | 5 | 3 | 4 | 4 |
| 2 | 6 | 7 | 8 | 6 | 7 | 8 |
| 3 | 0 | 1 | 2 | 0 | 1 | 2 |
| 4 | 3 | 4 | 5 | 3 | 4 | 4 |
| 5 | 6 | 7 | 8 | 6 | 7 | 8 |

A

|   | 0 | 1 | 2 | 3 | 4 | 5 |
|---|---|---|---|---|---|---|
| 0 | 0 | 0 | 0 | 1 | 1 | 1 |
| 1 | 0 | 0 | 0 | 1 | 1 | 1 |
| 2 | 0 | 0 | 0 | 1 | 1 | 1 |
| 3 | 2 | 2 | 2 | 3 | 3 | 3 |
| 4 | 2 | 2 | 2 | 3 | 3 | 3 |
| 5 | 2 | 2 | 2 | 3 | 3 | 3 |

DEVICE AND METHOD FOR CALCULATING CONVOLUTION IN A CONVOLUTIONAL NEURAL NETWORK

CROSS-REFERENCE TO RELATED APPLICATIONS

This application is a National Stage of International patent application PCT/EP2017/060016, filed on Apr. 27, 2017, which claims priority to foreign French patent application No. FR 1653745, filed on Apr. 27, 2016, the disclosures of which are incorporated by reference in their entirety.

FIELD OF THE INVENTION

Technical Field

The present invention generally relates to artificial neural networks and in particular to a device and method for computing convolution in a convolutional neural network.

BACKGROUND

Artificial neural networks are computational models imitating the operation of biological neural networks. Artificial neural networks comprise neurons that are interconnected by synapses, which are conventionally implemented by digital memories. The synapses may also be implemented by resistive components the conductance of which varies as a function of the voltage applied across their terminals. Artificial neural networks are used in various fields in which (visual, audio, inter alia) signals are processed, such as for example in the field of image classification or of image recognition.

Convolutional neural networks correspond to a particular artificial-neural-network model. Convolutional neural networks were first described in the article by K. Fukushima, "Neocognitron: A self-organizing neural network model for a mechanism of pattern recognition unaffected by shift in position. Biological Cybernetics, 36(4):193-202, 1980. ISSN 0340-1200. DOI: 10.1007/BF00344251".

Convolutional neural networks (which are also referred to as deep (convolutional) neural networks or even ConvNets) are feedforward neural networks inspired by biological visual systems.

Convolutional neural networks (CNNs) are in particular used in image-classification systems to accelerate classification. Applied to image recognition, these networks are able to learn to identify intermediate representations of objects found in images, which intermediate objects are smaller and generalizable to similar objects, this facilitating recognition thereof. However, the intrinsically parallel operation and the complexity of conventional convolutional-neural-network classifiers has slowed their effective implementation in on-board systems. Specifically, on-board systems are highly constraining in terms of footprint and power consumption.

Ways of implementing neural networks on graphic processing units (GPUs) have been proposed with a view to improving the performance thereof, such as for example the solution described in the article by D. C. Ciresan, U. Meier, J. Masci, L. M. Gambardella, and J. Schmidhuber, "Flexible, high performance convolutional neural networks for image classification. Proceedings of the Twenty-Second International Joint Conference on Artificial Intelligence—Volume Two", IJCAI' 11, pages 1237-1242, 2011. ISBN 978-1-57735-514-4. DOI: 10.5591/978-1-57735-516-8/IJCAI11-210.

A plurality of hardware implementations of spiking convolutional networks have in particular been proposed by L. Camunas-Mesa, C. Zamarreno-Ramos, A. Linares-Barranco, A. Acosta-Jimenez, T. Serrano-Gotarredona, and B. Linares-Barranco in "An event-driven multi-kernel convolution processor module for event-driven vision sensors." *Solid-State Circuits, IEEE Journal of,* 47(2):504-517, 2012. ISSN 0018-9200. DOI: 10.1109/JSSC.2011.2167409. Such a convolutional implementation uses a separate digital memory to store the coefficients of the convolution kernels and requires these coefficients of the kernel to be copied from the memory to the arithmetic logic unit (ALU) each time a spike is received.

Another solution, called "TrueNorth", has been proposed by Paul A. Merolla, John V. Arthur, Rodrigo Alvarez-Icaza, Andrew S. Cassidy, Jun Sawada, Filipp Akopyan, Bryan L. Jackson, Nabil Imam, Chen Guo, Yutaka Nakamura, Bernard Brezzo, Ivan Vo, Steven K. Esser, Rathinakumar Appuswamy, Brian Taba, Arnon Amir, Myron D. Flickner, William P. Risk, Rajit Manohar, and Dharmendra S. Modha, in "A million spiking-neuron integrated circuit with a scalable communication network and interface" Science, 8 Aug. 2014: 345 (6197), 668-673. This solution provides a neuromorphic chip based on a multicore architecture comprising conventional processing units specialized in spiking neural models. It is in particular based on an architecture and contains 268 million synapses per chip, distributed over 4096 cores containing 256 neurons. Each core uses an SRAM to create a binary connection between the inputs/outputs and each core has a 3-level synaptic precision. The cores operate asynchronously. Such a solution is however not specialized in convolutional neural networks, thereby implying a large amount of memory and redundancies when one is implemented. In addition, the synaptic precision of the cores is insufficient, this implying a distribution of the computation of a convolution layer over a plurality of cores and therefore processor and memory redundancy. Furthermore, this solution does not virtualize the time of the spikes, but uses real-time to code this information. This implies the use of low operating frequencies (of the order of a kHz), this making this type of solution naturally incompatible with applications requiring rapid processing of data (classification of thousands of images per second for example) and therefore limiting its field of use.

Existing hardware implementations of spiking convolutional networks are all based on a conventional processing unit and are limited by the size of the digital-memory data bus. Moreover, they require, first of all, the value stored in the memory to be retrieved before it is possible to perform an operation thereon. Thus, for example, if the memory bus is 64 bits in size and the coefficients are stored on 8 bits, it is possible to retrieve, in each clock cycle, only 8 coefficients. Millions of clock cycles may therefore be necessary depending on the number of coefficients in the network. The processing time and the power consumption required to compute all of the outputs of the network for a given input are therefore very high. This drawback is referred to as the von Neumann bottleneck, a fundamental shortcoming of this type of architecture. It is at best possible to limit such a bottleneck (without however removing it) by using SIMD (single instruction on multiple data) instructions, which allow several data items to be processed in one processor instruction, and by using memory distributed with several processing units, as in GPUs or in the TrueNorth architecture. GPU architectures are however not optimized for implementation of spiking networks, whereas the TrueNorth solution has a limitingly low operating frequency.

There is therefore a need for improved processors based on spiking-convolutional-neural-network architectures capable of meeting the constraints in terms of footprint and power consumption of on-board systems, without decreasing classification performance.

SUMMARY OF THE INVENTION

The invention aims to improve the situation by providing a processor for computing at least one convolution layer of a spiking convolutional neural network, in response to an input event, the convolutional neural network comprising at least one convolution kernel, the convolution kernel containing weight coefficients. The processor comprises at least one convolution module configured to compute the one or more convolution layers, each convolution module comprising a set of elementary processing units for computing the internal value of the convolution-layer neurons that are triggered by the input event, each convolution module being configured to match the weight coefficients of the kernel with certain at least of the elementary processing units of the module in parallel, the number of elementary processing units being independent of the number of neurons of the convolution layer.

The invention thus provides a processor dedicated to spiking convolutional neural networks that is optimal in certain configurations in terms of the amount of memory used for the filters and constant in terms of the processing time whatever the size and number of the convolution filters (for a given maximum total number of operations).

The invention provides a solution compatible with the constraints of on-board systems both in terms of footprint and in terms of power consumption, without however decreasing classification performance.

The invention is furthermore optimal in terms of the amount of memory and the number of processors required.

The topology of the processor may be digital or hybrid. It is thus possible to implement it with analogue memory systems and processors of very low power consumption.

Embodiments of the invention are furthermore optimal for the processing of convolution layers. They in particular allow a complete spatial parallelism while providing a high synaptic precision with a minimum of memory and of processors.

BRIEF DESCRIPTION OF THE DRAWINGS

Other features and advantages of the invention will become apparent with the aid of the following description and the figures of the appended drawings, in which:

FIG. 11 illustrates the distribution of the neurons and of the addresses of the integration values over the output matrix, according to one example embodiment;

Figure 1:
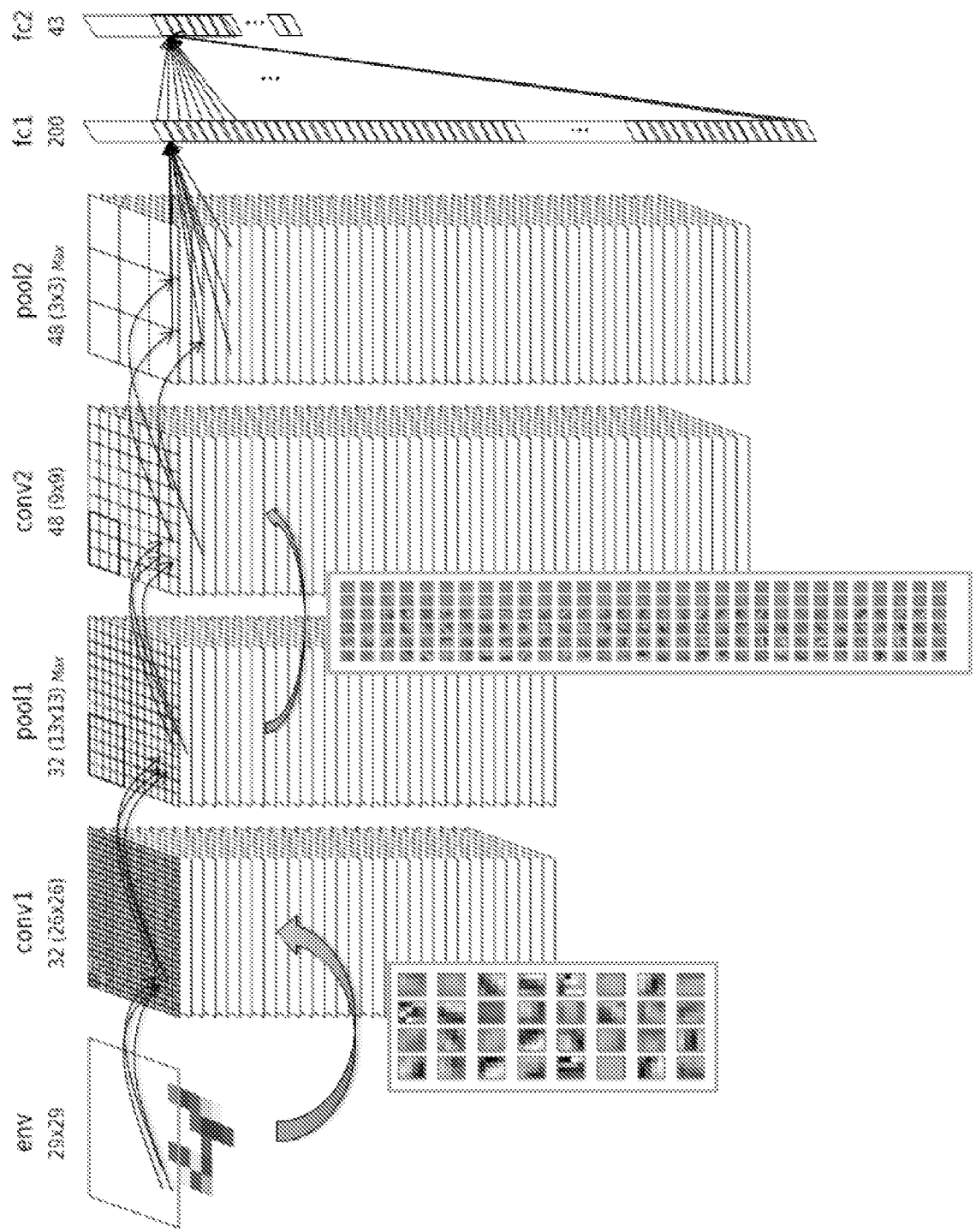
FIG. 1 shows an example of a convolutional network including pooling layers, for the classification of images and of perceptrons.

The drawings will not only serve to allow the description to be better understood, but may, where appropriate, also contribute to the definition of the invention.

DETAILED DESCRIPTION

To facilitate the comprehension of the description of certain embodiments, some features and definitions regarding neural networks are given below.

A neural network consists of one or more convolution layers, optionally including pooling layers. The layers may be followed by a multilayer perceptron classifier. The output of a convolution layer may be connected to the input of the following layer.

In a convolution layer, each neuron is connected to at least one portion (sub-matrix) of the input matrix. The submatrices have the same size for a given layer and their size is equal to the size of the filter. They may be offset from one another regularly and may overlap. The input matrix may be of any size. However, the input matrix is generally 2-D with values represented by gray-scale levels, the position of a given pixel being provided by its XY coordinates. For a color image, a plurality of gray-scale levels and a plurality of input matrices are used. The coordinates of a pixel are then expressed in XYZ.

In a neural network, the neurons are connected to their input sub-matrix/by synapses the weight of which is adjustable. The matrix K of the synaptic weights (the synaptic weights are also called "weight coefficients" or "convolution coefficients" or "weightings") that is applied to the input sub-matrices of the neurons is the same for all the neurons of a given output map (i.e. what is more commonly called a feature map). Such a matrix K is also called a "convolution kernel". The fact that the convolution kernel is shared by all of the neurons of a given output map O, and therefore applied to all of the input matrix, decreases the memory required to store the coefficients, this optimizing performance. For example, for image recognition, this makes it possible to minimize the number of filters or intermediate representations that best code the features of the image and that are reusable in all the image. The coefficients of a convolution kernel K (i.e. the synaptic weights) may correspond to conventional signal-processing filters (for example Gaussian, Gabor, Laplace, etc. filters), or be determined by supervised or unsupervised learning, for example using a gradient-back-propagation algorithm. The coefficients of the convolution kernels may be positive or negative and are generally normalized to between −1 and 1, just like the input and output values of the neurons.

A spiking neuron may be defined by at least two functions:
   an integration function that integrates the input values of the neuron and which may implement a leakage.
   an activation function that takes as parameters the values of the integration and delivers the output values of the neuron. An activation function is defined by a value-limited, parameterized nonlinear algebraic function that has real what are called "input" variables depending on the neuron model used. A neuron is furthermore characterized by an activation function g( ) used to compute the response of a neuron (representing the internal value of the neuron) to an input event, a threshold and connection weights (also called "synaptic weights" or "convolution coefficients").

The model of the neuron is defined by a nonlinear algebraic function. This function may take as an argument the integration value (representing the internal value of a neuron) but also, depending on the model, the time or the output of an internal counter. Such as used here, the expression "integration" means the integral as a function of time of the weighted spike trains input into the neuron (i.e. the temporal integral of a weighted spike train (a Dirac comb for example)). This integration may be reset to zero when the neuron triggers (i.e. produces an output spike).

A neuron produces, initially, the integral of the weighted spikes (with leakage depending on the model). The spikes may be unitary in value, i.e. 1 or −1 (the value "−1" is not always used). The weightings come from the filter. The value resulting from the integration is denoted I: g(I). Conventionally, g may take the form of a sigmoid function, such as for example the hyperbolic tangent function.

A convolution layer may contain one or more convolution kernels that each have an input matrix, which may be the same, but that have different coefficients corresponding to different filters.

Each convolution kernel in a layer produces a different output map so that the output neurons are different for each kernel. Convolutional networks may also include local or global pooling layers that combine the group outputs of neurons of one or more output maps. The outputs may be combined for example by taking, for the corresponding output, the maximum or average value of the outputs of the neuron group to the output map of the pooling layer. The pooling layers allow the size of the output maps to be decreased from one layer to the next in the network, while improving its performance by making it more tolerant to small deformations or translations in the input data.

Convolutional networks may also include completely connected perceptron-type layers.

FIG. 1 shows an example of a convolutional network including pooling layers, for the classification of images. The images at the bottom of FIG. 1 show an extract of the convolution kernels of the first layer, after training, of gradient-back-propagation type, on a database of images such as ImageNet.

Figure 2:
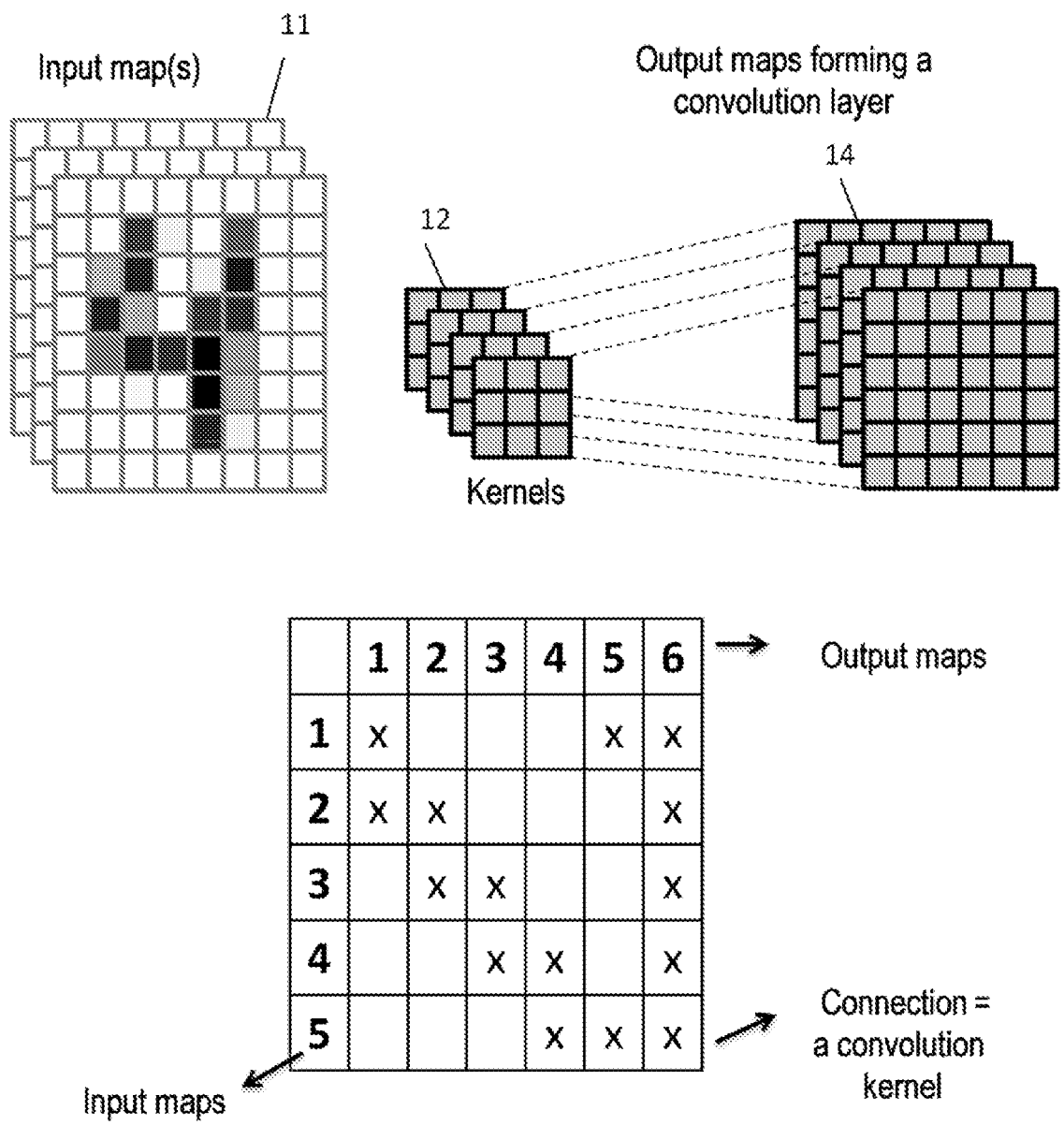
FIG. 2 is a schematic showing a convolution layer made up of a plurality of output maps.

As illustrated in FIG. 2, a convolution or pooling layer may consist of one or more output matrices 14 (also called output maps or more commonly output feature maps), each output map being able to be connected to one or more input matrices 11 (also called input maps).

Figure 3:
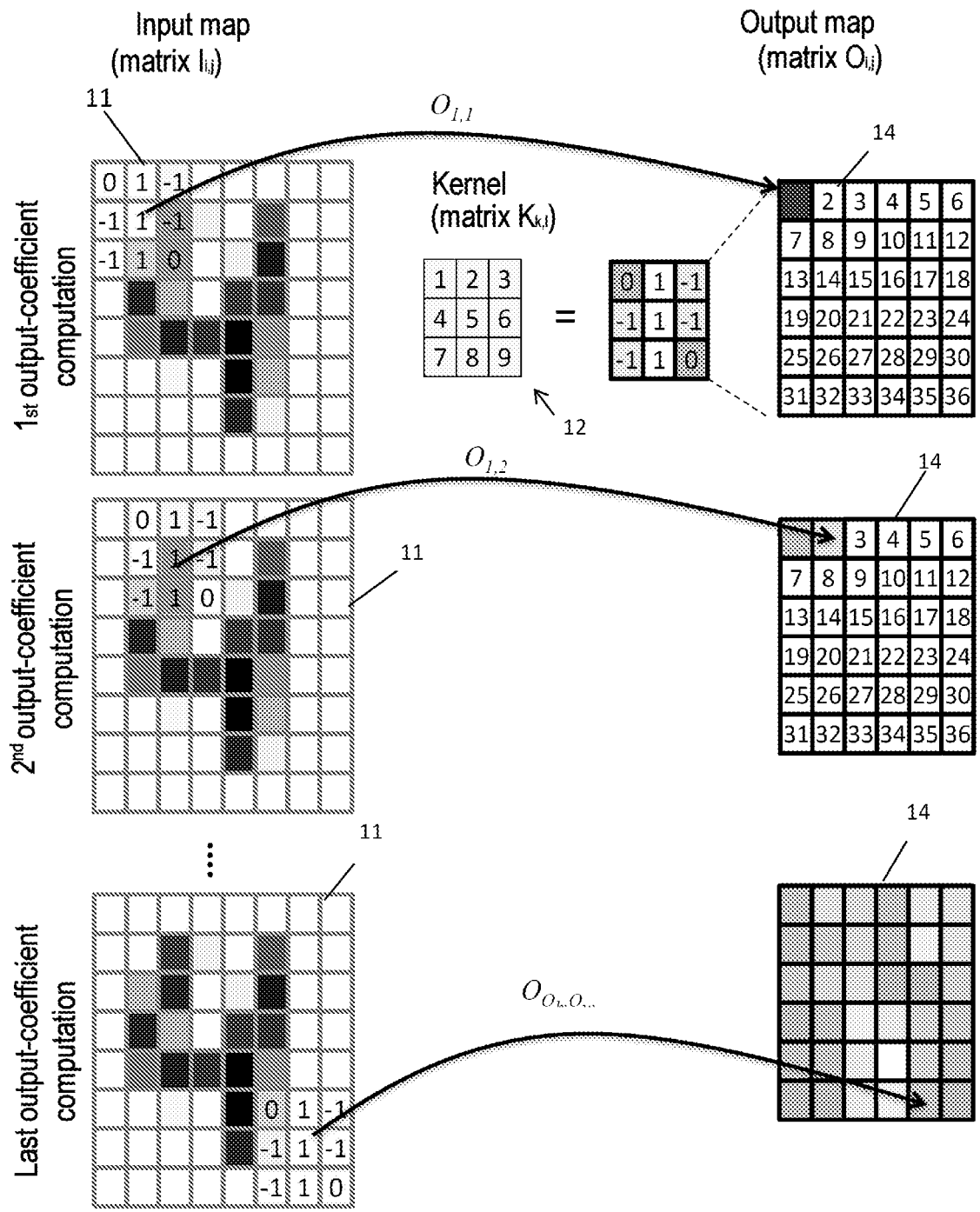
FIG. 3 illustrates the operating principle of a convolution layer in a convolutional neural network.

As illustrated in FIG. 3, an output matrix, denoted O, contains coefficients $O_{i,j}$, and has a size denoted $(O_h, O_w)$. This matrix corresponds to a matrix of neurons and the coefficients $O_{i,j}$ correspond to the output values of these neurons, computed on the basis of the inputs and of the synaptic weights.

An input matrix or map 11 may correspond to an output map of a preceding layer or to an input matrix of the network that receives stimuli or a portion of the stimuli to be processed. A network may consist of one or more input matrices 11. It may for example be a question of RGB, HSV, YUV components or of any other type of conventional image component, with one matrix per component. An input matrix, denoted I, contains coefficients $I_{i,j}$ and has a size denoted $(I_h, I_w)$.

An output map O may be connected to an input matrix I by a convolution operation, via a convolution kernel 12 denoted K (a convolution kernel is also called a filter, or convolution matrix), of size (n, m) and containing coefficients $K_{k,l}$. Each neuron of the output map 14 is connected to a portion of the input matrix 11, this portion then being called the "input sub-matrix" or "receptive field of the neuron" and being the same size as the convolution matrix K. The convolution matrix K containing the synaptic weights is common to all of the neurons of the output map O (the weights of the matrix K are then said to be "shared weights"). Each output coefficient of the output matrix $O_{i,j}$ then satisfies the following formula:

$$O_{i,j} = g\left( \sum_{k=0}^{min(n-1,I_h-i\cdot s_i)} \sum_{l=0}^{min(m-1,I_w-j\cdot s_j)} I_{i\cdot s_i+k, j\cdot s_j+l} \cdot K_{k,l} \right)$$

In the above formula, g( ) designates the activation function of the neuron, whereas $s_i$ and $s_j$ designate vertical and horizontal stride parameters, respectively. Such a stride corresponds to the offset between each application of the convolution kernel on the input matrix. For example, if the stride is larger than or equal to the size of the kernel, then there is no overlap between each application of the kernel.

An output map O is connected to an input matrix I by a pooling operation that sub-samples the input matrix, this delivering a sub-sampled matrix. The sub-sampling may be of two types:

a sub-sampling of the type called "MAX pooling", according to the equation below:

$$O_{i,j} = g(\max_{k=0}^{min(n-1,I_h-i,s_i)} \max_{l=0}^{min(m-1,I_w-j,s_j)} I_{i.s_i+k,j.s_j+l})$$

a sub-sampling of the type called "AVERAGE pooling", according to the equation below:

$$O_{i,j} = g\left(\frac{1}{n.m} \sum_{k=0}^{min(n-1,I_h-i,s_i)} \sum_{l=0}^{min(m-1,I_w-j,s_j)} I_{i.s_i+k,j.s_j+l}\right)$$

The synaptic weights associated with the connections in the case of a pooling layer are generally unitary and therefore do not appear in the above formulae.

A completely connected layer comprises a set of neurons, each neuron being connected to all the inputs of the layer. Each neuron $O_j$ has its own synaptic weights $W_{i,j}$ with the corresponding inputs $I_i$ and carries out the weighted sum of the input coefficients with the weights, which is then passed to the neuron activation function to obtain the output of the neuron.

$$O_j = g\left(\sum_i I_i.W_{i,j}\right)$$

The neuron activation function g( ) is generally a sigmoid function, such as for example the function tanh( ). For the pooling layers, the activation function may for example be the identity function.

The synaptic weights may be determined by training. The training of a neural network consists in finding the optimal values of the synaptic weights using an optimization method and a training database. There are many training methods such as the gradient-back-propagation method, the basic principle consisting, on the basis of a stimulus input into the network, in computing the output of the network, comparing it to the expected output (in the case of what is called supervised training) and back-propagating an error signal through the network, which amounts to modifying the synaptic weights via a gradient-descent method.

Such as used here, a convolution layer may therefore be defined as comprising one or more output matrices 14 containing a set of output neurons, each output matrix being connected to an input matrix (the input matrix containing a set of input neurons) by artificial synapses that are associated with a convolution matrix containing the synaptic weight coefficients corresponding to the output neurons of the output matrix, the output value of each output neuron being determined on the basis of the input neurons of the input matrix, to which neurons the output neuron is connected, and of the synaptic weight coefficients of the convolution matrix associated with the output matrix.

Figure 4:
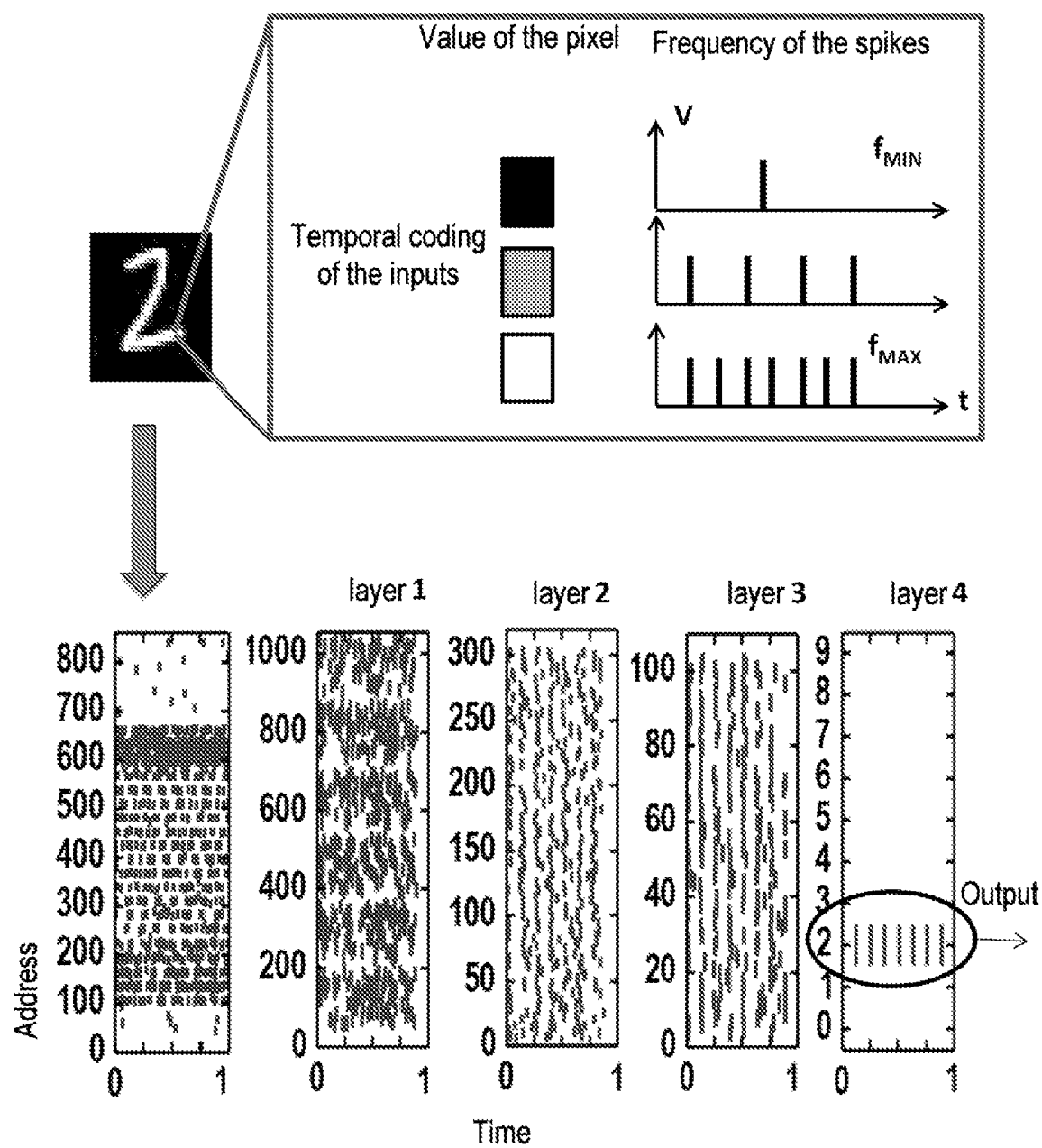
FIG. 4 is a schematic illustrating spike coding and propagation in the spiking neural network.

The networks of neurons may be transposed via spike coding as illustrated in FIG. 4. In this case, the signals propagated as input and as output of the layers of the network are no longer numerical values, but electrical spikes (similar to Dirac spikes). The information that was coded in the value of the signals (normalized between −1 and 1) is then temporally coded with the order of arrival of the spikes (rank-order coding) or with the frequency of the spikes.

In the case of rank-order coding, the arrival time of the spike is inversely proportional to the absolute value of the signal to be coded. The sign of the spike then sets the sign of the value of the signal to be coded.

In the case of frequency coding, the frequency of the spikes, comprised between $f_{min}$ and $f_{max}$, is proportional to the absolute value of the signal to be coded. The sign of the spike sets the sign of the value of the signal to be coded. For example, considering an input matrix of the network corresponding to the brightness component of an image, normalized between 0 and 1, a pixel (or coefficient of the matrix) that is white, coded by a value 1, will emit spikes at a frequency $f_{max}$, a black pixel, coded by a value 0, will emit spikes at a frequency $f_{min}$, whereas a gray pixel, coded by a value x, will emit spikes at a frequency $f=f_{min}+x(f_{max}-f_{min})$. The coding may also be pseudo-frequency coding, poissonian for example: in this case $f_{max}$ and $f_{min}$ are merely average frequencies. The initial phase of the spikes may be random.

The spikes may also originate directly from a sensor, such as an artificial cochlea or a retina, imitating the operation of their biological equivalent.

Figure 5:
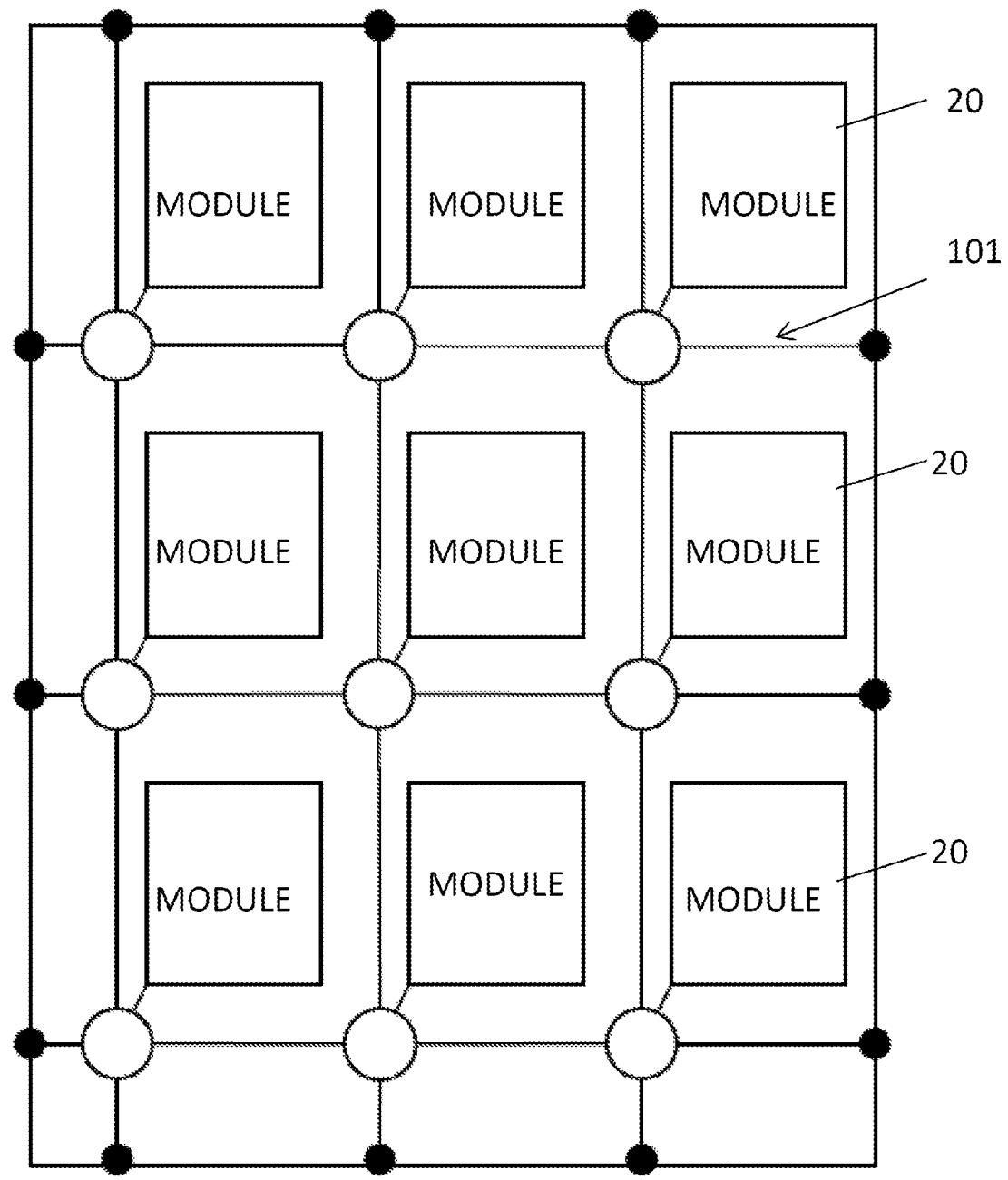
FIG. 5 schematically shows a processor for computing at least one convolution layer.

FIG. 5 schematically shows a processor 100 configured to compute at least one convolution layer (also referred to as "neuromorphic computation") of a convolutional neural network comprising at least one convolution kernel 12, the kernel containing weight coefficients, according to certain embodiments.

According to one aspect of the invention, the processor comprises at least one convolution module 20 (also called a "convolution block") that is configured to compute each convolution layer, each convolution layer consisting of one or more output maps.

The computation of a convolution layer consists in computing the internal value (also called the "integration value") of the neurons that have received an input event (such as a spike). When this integration value exceeds a predefined threshold, the neurons are "triggered" or "activated" and emit an event (spike) as output. The computation of a convolution layer thus consists in determining the response of the neurons of the convolution layer to an input event.

The convolution processing modules 20 may be interconnected by an interconnect system 101. In one embodiment, the convolution processing modules 20 may be interconnected using a network on chip (NOC). A network on chip allows the events to be redirected between the modules and/or the inputs/outputs. The network ensures the connection between the various layers of the neural network 10. In certain embodiments, the network on chip may implement in addition a function for managing the priorities and synchronization of the input events.

The rest of the description will make reference to an interconnect system of the network-on-chip type by way of nonlimiting example. Those skilled in the art will however easily understand that other interconnect systems may be used such as, for example, programmable interconnect systems (e.g. FPGAs), static-routing interconnect systems, etc. Each convolution processing module carries out a convolution operation on a or a portion of a layer of the network.

Each convolution module 20 may be used to compute a different convolution layer associated with a convolution kernel ("filter"). However, each convolution module 20 may be used to realize a plurality of filters in a given convolution layer. In certain embodiments, when a convolution module 20 is not enough to compute a given convolution layer, a plurality of convolution modules may be used to compute this convolution layer.

Each convolution module 20 comprises a set of processing units 200 (also called "elementary processing units"), such as processors or sub-processors.

For the input event of the convolution layer (defining the point of application of the convolution kernel 12), the module is configured to match the coefficients of the convolution kernel 12 with certain at least of the processing units 200 in parallel, the number of processing units being independent of the number of neurons of the convolution layer.

For each input event, each processing unit 200 is associated with a convolution-kernel weight coefficient. In particular, the number of processing units may be at least equal to the number of coefficients of the convolution kernel (size of the convolution kernel).

Each processing unit may compute the value of a set of independent neurons triggered by input events, depending on the weight coefficient associated with the processing unit for each input event.

In one embodiment of a spiking neural network, the input event is represented by a spike received by the network. A spiking neural network may receive, over time, a train of spikes, each spike possibly triggering one or more neurons.

The input event may then be defined by an input address in the convolution layer. The rest of the description will make reference to a spiking convolutional neural network in order to facilitate comprehension of the invention.

Such as is used here, the "input address" of a spike is the address of the spike emitted by the preceding layer (input spikes) and received by the layer in question. In the system, the spikes may be transmitted by a series bus. The spikes therefore propagate therewith at least their emission address.

When a spike (defined by an input address) is received by a convolution layer, the connection between the output neurons and the input neurons on the input map means that this spike is not received by all the neurons of this layer. Thus, for a given input spike, there are neurons that may not receive this spike, at the same time. Such neurons are said to be independent. In addition, the number of neurons receiving a given spike at the same time is at most equal to the size of the convolution filter associated with the convolution layer. These two properties are due to the topology of convolutional networks.

According to one feature of the invention, to carry out the computation of the response of a given convolution layer to an input spike (input event), at least N elementary processing units 200 may be used in parallel and their operation may be sequential (the number N is the maximum number of elements able to be processed in the convolution filter), the processing units being associated with independent neurons working in parallel.

Each processing module 200 thus forms a processing core. Each processing core may be used to compute one or more convolution operations on one or more portions of a convolution layer 4 of the convolutional network 10 with a complexity O(1), i.e. the processing time is independent of the data to be processed (the processor is said to be time constant).

In certain applications of the invention, the processor 100 may be a multicore distributed-memory processor, each core possibly being interconnected by the interconnect system 101.

The various convolution layers 4 of the convolutional neural network 10 may be distributed over the various processing modules 20. As a variant, the convolution layers 4 may be associated with the same module 20 using z and L offsets and a loop going from the convolution module 20 to itself.

To compute the response of the triggered neurons (internal value of a neuron), each processing unit 200 uses a chosen computational neuron model. The neuron model may be defined during programming of the system. In certain embodiments, it may be identical for all the neurons of a layer.

A given elementary processing unit 200 may advantageously be associated with a plurality of independent neurons (i.e. a single of the independent neurons associated with a given processing unit triggers for a given input spike). Each elementary data processing unit 200 is configured to generate an output value representing the output value of each independent neuron that is associated therewith. The output value results from the integration of the input values received by the neuron over time, each value being weighted by a weight coefficient of the convolution kernel. This temporal integration is determined using an algebraic function (also called the "activation function" or "transition function") that depends on the computational neuron model.

The elements making up the input matrix and the output maps of the neural network may be integer or fixed- or floating-point decimal numbers. In a "spiking" neural network, the input and output values are coded with spikes. An input or output value may thus be coded by the number of spikes during a fixed time window (frequency coding), or by the emission time of a spike using a rank-order-coding technique. In embodiments of spiking neural networks using frequency coding, the weighted sum h is computed by accumulating the coefficient of the convolution kernel 14 on each reception of a spike by the corresponding input. The activation function g of the neuron may in this case be replaced by a threshold. When the absolute value of h exceeds the threshold following the reception of a spike by the input sub-matrix, the output neuron emits a spike of the sign of h and resets the weighted sum h to the value 0. The neuron then enters into what is called a "refractory" period during which it can no longer emit spikes for a fixed period. The spikes may therefore be positive or negative, depending on the sign of h at the moment at which the threshold is exceeded. A negative spike as input inverts the sign of the coefficient of the corresponding kernel for the accumulation.

Computational spiking-neural models define the computation of the temporal integration of the information. The response of a neuron to a stimulation is the emission time of the next spike. A spike is emitted at the moment at which the excitation of the neuron exceeds the threshold. A virtual clock may be used to delay the emissions of spikes from the neurons, the spikes possibly then being considered to be dated events. There are several types of spiking-neuron models, such as for example:

The Hodgkin and Huxley (HH) model, which is defined by four interdependent differential equations, and which describes the dynamic temporal behavior of the neuron by way of variations in ion (K+, Ca2+) concentrations in various compartments and reproduces the main "modes" of operation of biological neurons.

The Integrate and Fire (IF) model, which is described by a single differential equation and which models the integrated circuit in the form of an electric circuit comprising a capacitor and a resistor (RC dipole). In this model, the dynamic behavior of the neuron is described by its membrane potential and by the current that flows therethrough.

Models related to the IF model such as the Leaky Integrate and Fire (LIF) model or the Quadratic Integrate and Fire (QIF) model, the conductance Integrate & Fire (gIF) model;

The Spike Response Model (SRM), which is based on the behavior of neurons (phenomenological modelling of neurons); this model comprises a kernel function providing the dynamic behavior of the membrane potential of the neuron and a function that computes the sum of the post-synaptic potentials; The Izhikevich model (Izhikevich, 2003), which uses two coupled differential equations to model the ion flux and the potential dynamics of the neuron.

Figure 6:
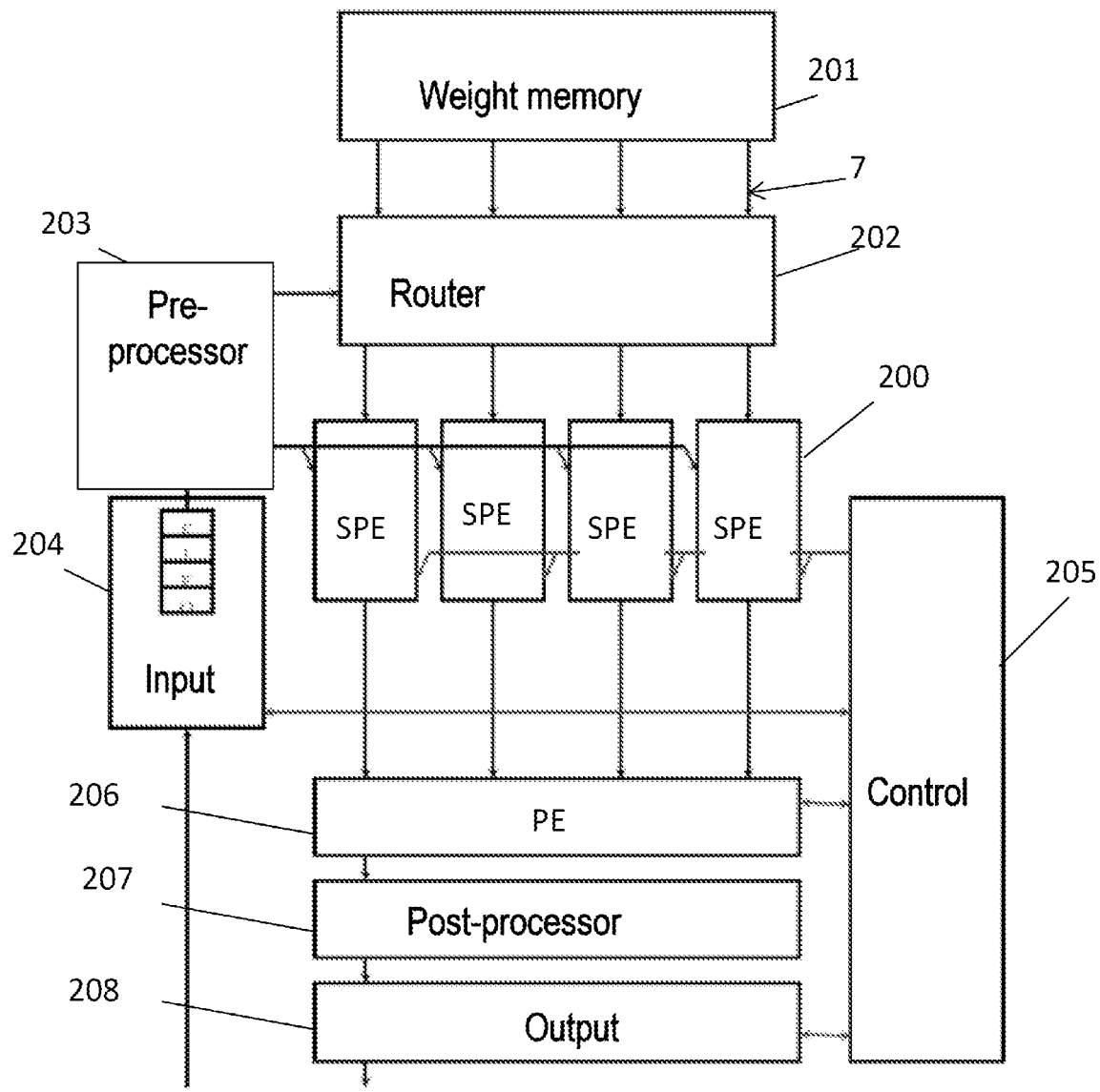
FIG. 6 shows the architecture of one processing module, in one embodiment using a spiking neural network.

FIG. 6 shows an example of an architecture of a processing module 20, in an embodiment based on a spiking-neural-network architecture, comprising 4 spike processing units 200 (or SPEs for spike processing elements) for generating the output events depending on a neuron model.

According to one aspect of the invention, each convolution module 20 comprises at least one weight-coefficient memory 201 for storing the weight coefficients of at least one convolution kernel, the weight-coefficient memory being accessible in parallel by said processing units. The weight-coefficient memory 201 may be used to store information on the output address, such as "Zout", which will be distributed to the processing units 200 in the processing phase. These data do not pass via the router.

The processing units 200 may thus read the memory 201 in parallel. However, in certain embodiments, a given datum of the memory 201 cannot be used at the same time by the various processing units. The memory 201 of the weight coefficients may be modified during the programming of the system.

Each convolution module 20 may furthermore comprise a routing unit 202 that is configured to distribute the weight coefficients of the memory 201 to the processing units 200 by means of a data bus comprising a set of lines for distributing the weight coefficients.

Each convolution module 20 is configured to compute the weight-coefficient addresses in the data bus 7 to be assigned to the processing units (200) depending on the input event and on data of the network (which may be programmed on start-up). The received weight coefficients are then used by the processing units 200 to compute the internal values of the neurons (integration value). The routing unit uses these weight-coefficient addresses $A_w$ to distribute the weight coefficients of the memory 201 to the processing units 200.

Figure 7:
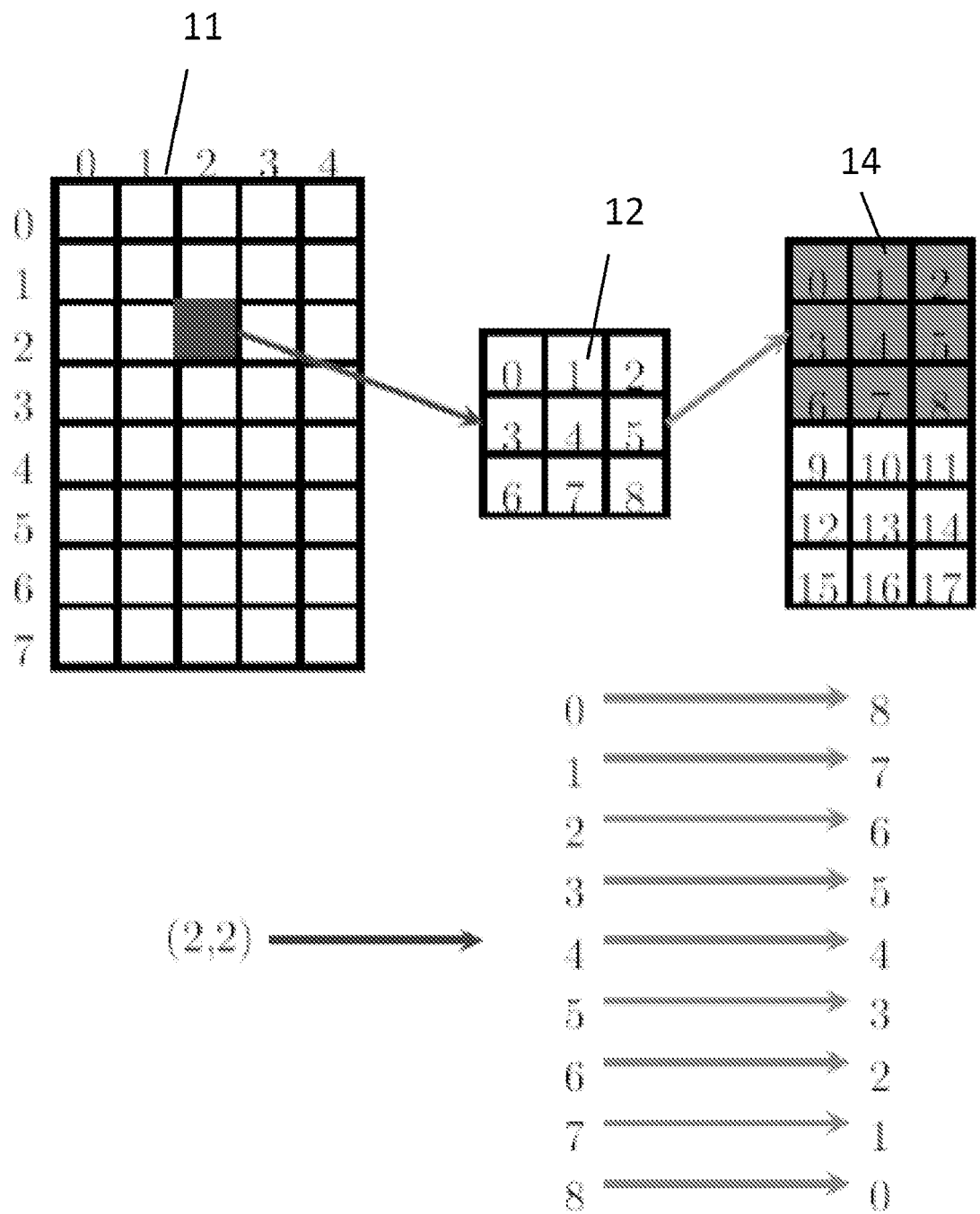
FIG. 7 shows the distribution of the weight coefficients depending on an input event.

In response to the emission of an event in the form of an electric spike (also called an "action potential") by an input neuron (pre-synaptic neuron), the spike passes through the synapses, this inducing a spike in a finite number of post-synaptic neurons that are then solicited (this number is at most equal to the number of elements in the filter of the convolution), as illustrated in FIG. 7. Such a property implies the existence of independent neurons in a layer of the neural network 10 subjected to a spike (two neurons are said to be independent if, for a given input event, they cannot be triggered at the same time).

Each convolution module 20 may comprise at least one neuron-value memory 2002 for storing the internal values (or "integration values") of the neurons, i.e. the values computed by the processing units 200. The one or more integration-value memories 2002 may be arranged outside the processing units 200. As a variant, each processing unit may comprise an internal integration-value memory 2002 as shown in the example of FIG. 6.

According to one embodiment, each convolution module may be configured to compute, for each input event and for each processing unit 200, a possible storage address for the neuron internal values computed by the processing unit in the integration-value memory 2002 on the basis of the input event and of at least one parameter of the convolution layer to be processed.

Each processing unit 200 may then select this address to store the neuron internal values computed by the processing unit.

According to certain embodiments, each processing module 20 may be configured to offload certain functions for groups of independent neurons of a given layer, and may in particular use a pre-processor 203 to carry out the computation of quantities that are usable in common by the processing units 200.

In certain embodiments, the pre-processor may offload the computation of the addresses of the weight coefficients, in the bus 7, to be assigned to the processing units 200 and/or the conputation of the storage address of the internal values of the neurons in the integration-value memory 2002.

A topology of the processing units 20 that allows the footprint of the processor 100 to be minimized results. In a given convolution layer, the neurons share the same weight coefficients (values of the convolution filter). In each processing module 20, the weight-coefficient memory 201 is distributed in parallel to the processing units 200 (SPEs) depending on the input events. Thus, the weight-coefficient memory 201 is not redundant. Such a distribution of the memory allows memory space to be optimized.

In one embodiment, each processing module 20 may comprise at least a number N of processing units 200 (SPEs). The number N of processing units 200 may be the maximum number of elements of the convolution, which corresponds to the number of memory cells. For example, for a convolution of maximum size of 11×11, the minimum number of processing units 200 is equal to 121.

Each processing module 20 may comprise an input function 204 forming a communication unit for implementing the communication logic, such as for example the AER, UART or RS232 protocol.

Each processing module 20 may furthermore comprise:
an output-managing unit 206 (PE) configured to manage the concurrence in the output events of the various elementary processing units 200; and/or
a post-processor 207 configured to carry out a variable-stride convolution; and/or
a controller 205 configured to control the sequencing of the tasks in the processing module and in particular to control concurrence in an output event.

The post-processor 207 is configured to select the output events that will be sent as output from the processing unit 200 depending on one or more operations on the output event.

Each processing module 20 may in particular comprise an input/output communication system (204 and 208).

Figure 8:
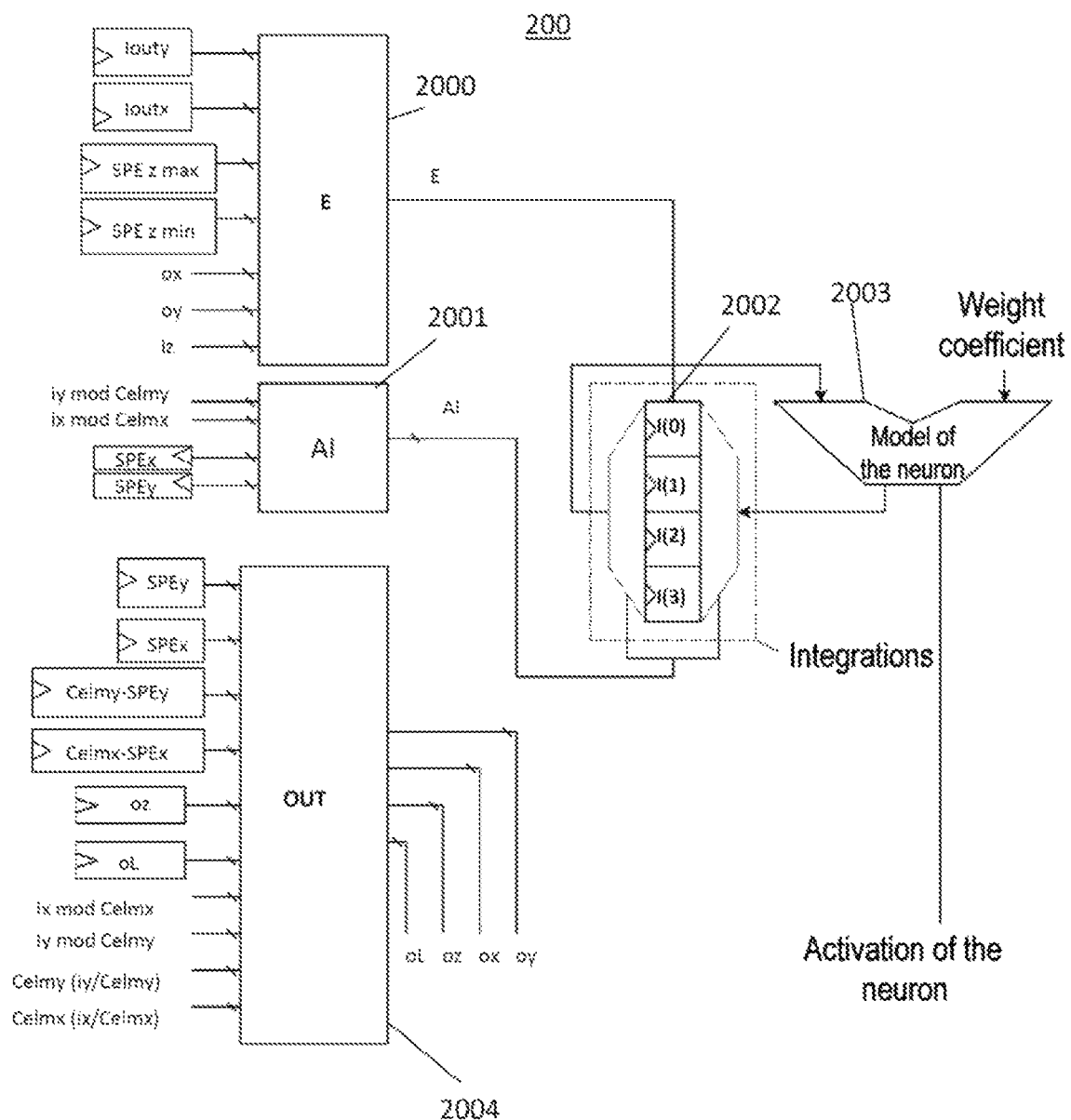
FIG. 8 shows the structure of a processing unit, according to certain embodiments.

FIG. 8 shows the structure of a processing unit 200, according to certain embodiments.

The signals propagated as input 2000 and as output 2004 of the layers of the network may be numerical values (case of non-spiking neural networks), in particular normalized numerical values between −1 and 1. As a variant, in embodiments using a spiking neural network as shown in FIG. 8, the signals propagated as input 2000 and as output 2004 of the layers of the network may be electrical spikes. The information is thus temporally coded depending on the order of arrival of the spikes or the frequency of the spikes.

Each processing unit 200 is associated with one or more independent neurons that share the arithmetic logic unit 2003 (ALU) of the neuron model, said unit being configured to compute the activation of each neuron; with a memory 2002 that is shared by the neurons, for storing the integration value I(i) computed for each independent neuron; and with an integration-address-computation function 2001 that is configured to determine the storage address of the integration values in the memory 2002. The association between the neurons of the network and the processing unit 200 is achieved by means of a weight-coefficient-address and integration-address computation.

In embodiments using a spiking neural network, as in the example of FIG. 8, each neuron i has a single place 2002 in the internal memory for storing its integration values I(i) (an integration value or temporal integration value I(i) designates the integration of spikes originating from the same inputs weighted by the synaptic weights over time). When the spikes are identical in absolute value (their sign possibly differing), their integral may be considered to be unitary or normalized. In the example of FIG. 8, the processing unit 200 comprises 4 integrations I(1), I(2), I(3), I(4).

The memory 2002 may be shared by independent neurons. It may therefore be read sequentially without breaking the spatial parallelism. In certain embodiments, the memory 2002 may be externalized and shared between a plurality of processing units 200.

Those skilled in the art will note that in certain embodiments, each convolution module 20 may comprise at least one neuron-internal-value memory 2002 arranged outside the processing units 200, for storing the neuron internal values computed by the processing units 200.

The destination address may have three components X, Y and Z depending on the format of representation chosen for coding the spikes. For example, the spikes passing between the layers of the neural network 10 may be coded in the address-event representation (AER) format. In such a format, each spike is digital and consists of a train of bits coding the address (X, Y) of the destination of the spike along two perpendicular axes X and Y, the coordinate system (X, Y) corresponding to the coordinate system of the input matrix, and the sign of the spike. When a spike is received by the input matrix, the coded address (X, Y) represents the location of the input neuron to be activated. Thus, when a spike is received by the input matrix, its address (X, Y) gives the location $I_{i,j}$ to be activated with X→j and Y→i.

In certain embodiments, the address may furthermore include Z and L components (L designates a layer component). In such embodiments, the Z and L components may be used to create memory offsets I and W. The weighting memory then includes a plurality of address lines per @W. The component L may also be used to dynamically change the configuration of a module.

Considering a two-dimensional spatial coordinate system (X, Y), the following definitions are provided:

The parameter $C_{elmX}$ designates the number of elements of the convolution matrix along the X-axis;

The parameter $C_{elmY}$ designates the number of elements of the convolution matrix along the Y-axis;

The parameter $O_{elmX}$ designates the number of elements of the output map along the X-axis;

The parameter $O_{elmY}$ designates the number of elements of the output map along the Y-axis;

The parameter $I_{elmX}$ designates the number of elements of the input map along the X-axis;

The parameter $I_{elmY}$ designates the number of elements of the input map along the Y-axis;

The parameter $i_x$ designates the coordinate of the input spike along the X-axis on the input map;

The parameter $i_y$ designates the coordinate of the input spike along the Y-axis on the input map;

The parameter $o_x$ designates the coordinate of the output spike along the X-axis on the output map;

The parameter $O_{elmX}$ designates the number of elements of the output map in X and is given by: $O_{elmX}=K_x \times C_{elmX}$;

The parameter $o_y$ designates the coordinate of the output spike along the Y-axis on the output map;

The number $O_{elmY}$ designates the number of elements of the output map in Y and is given by: $O_{elmY}=K_y \times C_{elmY}$;

$SPE_x$ designates the coordinates along the X-axis of an SPE processing unit (200);

$SPE_y$ designates the coordinates along the Y-axis of an SPE processing unit (200);

$s_x$ designates an intermediate coordinate between $o_x$ and $SPE_x$;

$s_y$ designates an intermediate coordinate between $o_y$ and $SPE_y$;

$A_I$ designates the integration address depending on $o_x$ and $o_y$;

$A_w$ designates the weight-coefficient address depending on $s_x$ and $s_y$;

SPE designates the address of an SPE processing unit depending on $o_x$ and $o_y$;

OUT designates the output-spike address depending on $o_x$ and $o_y$.

It should be noted that the address of an SPE processing unit depending on $o_x$ and $o_y$ satisfies:

$$SPE(o_x, o_y) = ((o_y \bmod C_{elmY}), (o_x \bmod C_{elmX})) \quad (1)$$

Figure 9:
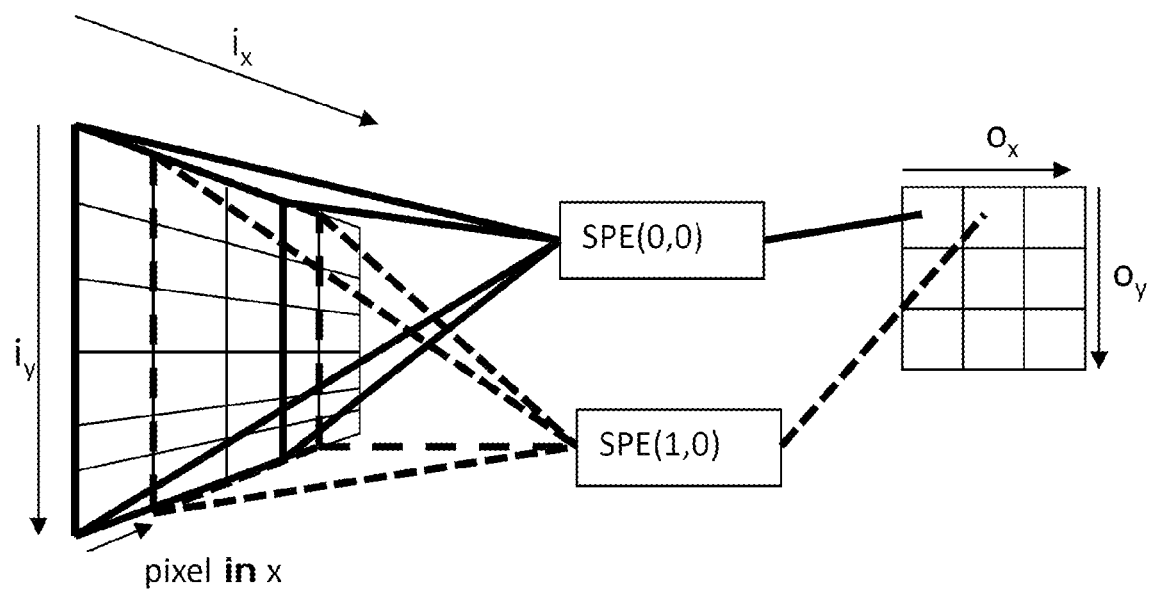
FIG. 9 illustrates one example embodiment for a 3×3 convolution over a 5×5 image.

FIG. 9 illustrates an example embodiment for a 3×3 convolution on a 5×5 image, showing the input coordinates ($i_x$, $i_y$), and output coordinates ($o_x$, $o_y$), and two processing units defined by their respective addresses SPE(0,0) and SPE(1,0).

In FIG. 9, the processing unit defined by SPE(0,0) is associated with 2 neurons. Likewise, the processing unit defined by SPE(1,0) is associated with 2 neurons.

The ALU 2003 may be configured to determine whether the absolute value of the total integration of the neuron g(h)=f(I(i)) in question is higher than a predefined threshold value (also called a "threshold"). If the absolute value of the integration exceeds the threshold by the value of the integration of the neuron (internal value of a spiking neuron), the neuron in question is configured to emit a spike as output 2004 that will be propagated to the neurons of the following layers connected to this neuron. The sign of this spike corresponds to the sign of the integration of the neuron. When the neuron emits a spike, its integration I(i) is reset to 0 and the neuron enters into what is called a "refractory" period, i.e. it cannot emit a new spike as output, until the end of the refractory period. The refractory period may also be equal to the minimum period of the spikes propagating through the network.

The address function 2001 is configured to guarantee that the coordinates on the output map of the neurons of a given processing unit 200 are separated by a distance D equal to at least the size of the processed convolution in X and in Y. Therefore, the neurons of a given processing unit cannot be triggered simultaneously.

Figure 10:
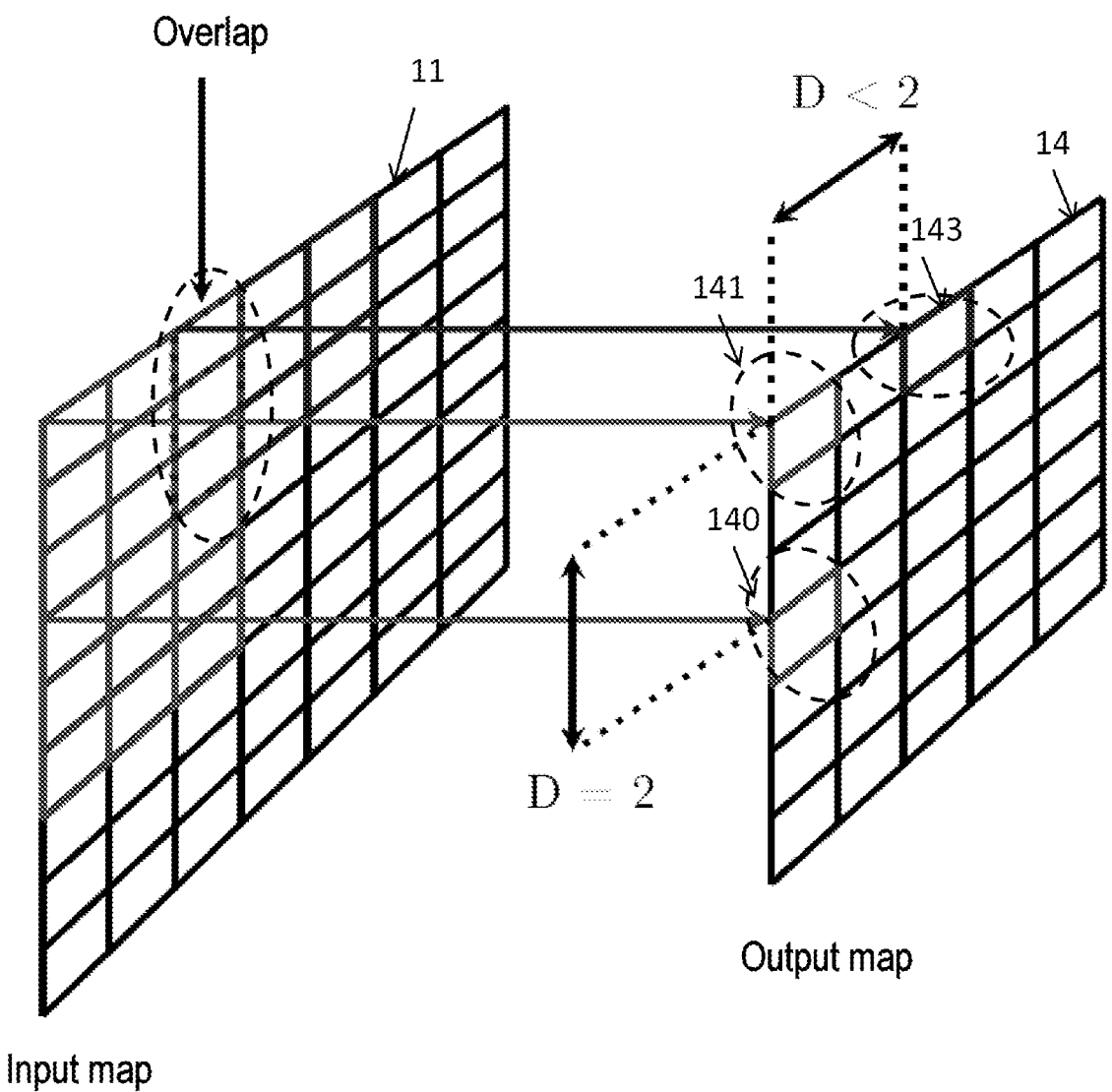
FIG. 10 illustrates the condition of independence of the neurons for a convolution of 3×3 size, according to one example embodiment.

FIG. 10 illustrates the condition of independence of the neurons for a convolution of 3×3 size. In FIG. 10, the 2 neurons 140 and 141 form part of the same processing unit 200 whereas the neuron 143 is located in a different processing unit.

The neurons are thus distributed in the processing units 200 depending on their position in the output matrix 14 so that each processing unit 200 contains only independent neurons. Thus, the coordinates of the neurons contained in a processing unit 200 are separated in the output matrix by at least a distance D equal to the size of the convolution to be processed.

Such a division of the space is represented by the equation below:

$$SPE(o_x, o_y) = ((o_y \bmod C_{elmY}), (o_x \bmod C_{elmX})) \quad (1)$$

In equation (1), $SPE(o_x, o_y)$ designates the processing unit 200 associated with the output neuron of output coordinates $(o_x, o_y)$.

Moreover, according to certain embodiments, the processor 100 may be configured to prevent the integrations $I_i$ of the neurons in a given processing unit 200 from being coincident. Thus, the processor may be configured to prevent two different coordinates in the output matrix along an axis in question (X or Y) from corresponding to the same processing unit 200 and to the same integration $I_i$. The address function 2001 denoted $A_I$ is therefore configured to satisfy:

$$A_I(o_x, o_y) = \left( \left\lfloor \left( \frac{o_y}{C_{elmY}} \right) \right\rfloor, \left\lfloor \frac{o_x}{C_{elmX}} \right\rfloor \right)$$

In the equations used in the present description, the notation $\lfloor A \rfloor$ designates the integer portion of A.

In FIG. 11, diagram A illustrates the distribution of the neurons over the output matrix 14 (value of the function SPE( )), according to one example embodiment, for:
a number $C_{elmX}$ of elements of the convolution matrix in X and a number $C_{elmY}$ of elements of the convolution matrix in Y equal to 3 ($C_{elmX} = C_{elmY} = 3$);
a number $O_{elmX}$ of elements of the output map in X and a number $O_{elmY}$ of elements of the output map in Y equal to 6 ($O_{elmX} = O_{elmY} = 6$).
Diagram B of FIG. 11 illustrates the distribution of the integration values over the output matrix 14, according to one example embodiment, for the same values of the parameters $C_{elmX}$, $C_{elmY}$, $O_{elmX}$ and $O_{elmY}$ as FIG. 10 ($C_{elmX} = C_{elmY} = 3$ and $O_{elmX} = O_{elmY} = 6$).

Figure 12:
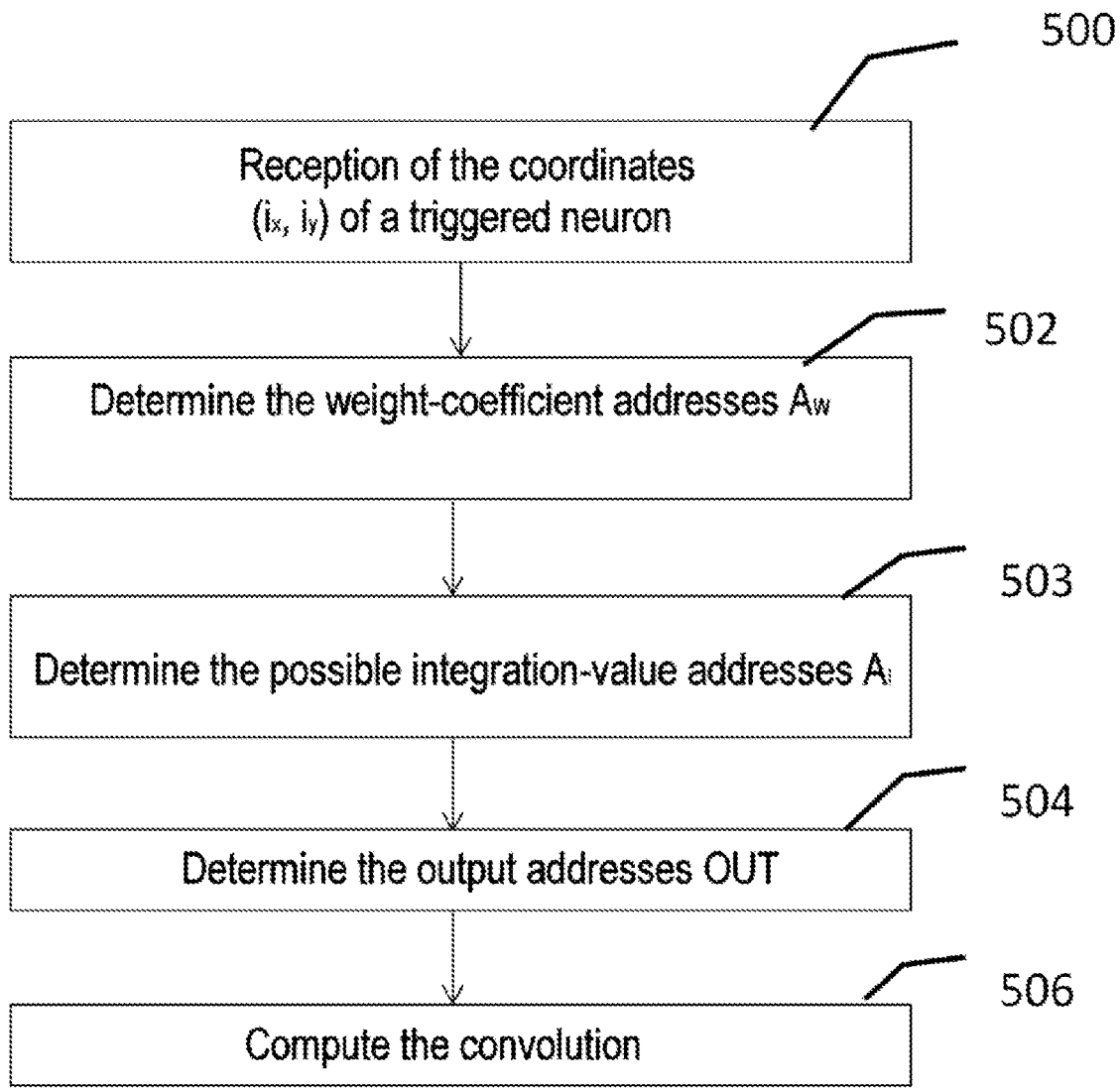
FIG. 12 is a flowchart showing the steps implemented by each processing module, according to one embodiment using a spiking convolutional neural network.

FIG. 12 is a flowchart showing the steps implemented by each processing module to compute at least one convolution layer of the convolutional neural network, according to one embodiment using a spiking neural network.

The relationships between the inputs and outputs of the convolution comprise:

$$\begin{cases} i_x - s_x = o_x \\ i_y - s_y = o_y \end{cases} \quad (3)$$

$$\begin{cases} s_x = (i_x - SPE_x) \bmod C_{elmX} \\ s_y = (i_y - SPE_y) \bmod C_{elmY} \end{cases} \quad (4)$$

$$A_w(s_y, s_x) = (s_y, s_x) \quad (5)$$

$$OUT(o_y, o_x) = (o_y, o_x) \quad (6)$$

In step 500, the coordinates $i_x$ and $i_y$ of a triggered neuron on the input map are received.

In steps 502, 503 and 504, the weight-coefficient addresses $A_w$, the possible integration-value addresses $A_I$ and the output addresses OUT are determined. The method for computing the convolution layer is based on reformulating the above equations depending on the SPE processing units (200) and on the input coordinates $i_x$ and $i_y$, to determine the addresses $A_w$, $A_I$ and OUT.

The weight-coefficient addresses $A_w$, determined in step 502, are the weight-coefficient addresses in the data bus 7 distributing the weight coefficients of the memory 201 as input to the routing unit 202, which addresses are to be assigned to the processing units (200) depending on the input event, the routing unit 202 using these weight-coefficient addresses $A_w$ to distribute the weight coefficients of the memory 201 to the processing units. In one embodiment, the weight-coefficient addresses may be determined by the pre-processor 203, which is external to the processing units. The weight-coefficient addresses $A_w$ may be determined on the basis of the coordinates of the triggered neuron on the input map $i_x$ and $i_y$, and of the parameters of the convolution layer (size of the convolution matrix and/or size of the output matrix).

The possible integration-value addresses $A_I$, determined in step 503, are a set of possible addresses for storage of the neuron internal values computed by the processing unit in the neuron-value memory 2002 on the basis of the input event and of at least one parameter of the convolution layer to be processed (size of the convolution matrix and/or size of the output matrix). Each processing unit 200 may then select one address from this set of possible addresses for storage of the neuron internal values computed by the processing unit 200. In particular, the input event is defined by an input address $(i_x, i_y)$ in the chosen coordinate system (X, Y) comprising the coordinates of the input event on the input map. Each processing unit moreover being associated with coordinates ($SPE_x$, $SPE_y$) in the coordinate system that correspond to the coordinates of the weight coefficient associated with the convolution matrix in the same coordinate system, each processing unit (200) may select one address from the set of possible addresses depending on the coordinates of the processing unit ($SPE_x$, $SPE_y$) in the coordinate system.

The possible integration-value addresses $A_I$ may be determined in step 503 by the pre-processor 203 that is external to the processing units 200.

In step 504, the output address OUT is the output address on the output map 14 of the triggered neurons. It may be determined by an output unit 2004 provided in each configured processing unit. The output address OUT may then be communicated to the other processing modules 20 of the processor.

In step 506, the convolution is computed for the input neuron in question by the processing units. Each processing unit 200 may compute the internal value of each neuron triggered by the input event using the coefficients of the weights distributed by the routing unit 202 depending on the weight-coefficient addresses $A_w$. The internal value computed by each processing unit 200 is stored in the integration-value address selected by the processing unit on the basis of the set of possible integration-value addresses $A_I$. In each processing unit 200, the arithmetic logic unit 2003 may then compute the output value of a neuron by applying the associated function to the computational neuron model.

In a spiking convolutional neural network in which the input values and the output values of each neuron are coded by spikes, the internal value of a neuron, i.e. the value computed by each processing unit, is the temporal integral of the input values received by the neuron, each input value being weighted by the weight coefficient associated with the processing unit for each input value of the neuron.

In one embodiment, the step of determining the weight-coefficient address $A_w$ (step 502 of FIG. 12) may be implemented as detailed below.

When a spike is received by the processor, the weight-coefficient address $A_w$ that each processing unit 200 must read is determined. It is the weight-coefficient address in the data bus 7. The weight-coefficient address thus determined will possibly be used by the routing unit 202 to distribute the weight coefficient applicable to each processing unit 200. The weight coefficient received by each processing unit 200 will be used by the processing unit to update the internal value of the neurons.

For each SPE processing unit (200), the weight-coefficient address $A_w$ may be determined depending on the coordinates of the processing unit in the chosen coordinate system ($SPE_x$; $SPE_y$) and depending on the coordinates of the input neuron on the input map ($i_x$; $i_y$).

In one embodiment, intermediate coordinates $s_x$ ($s_y$, respectively) between the corresponding output coordinate $o_x$ on the output map ($o_y$, respectively) and the corresponding coordinate of the processing unit $SPE_x$ ($SPE_y$, respectively) may firstly be determined depending on the coordinates ($SPE_x$; $SPE_y$) of the processing unit in the chosen coordinate system, of the coordinates of the input neuron on the input map ($i_x$; $i_y$), and of the number of elements $C_{elmX}$ ($C_{elmY}$, respectively) of the convolution matrix along the corresponding axis X (Y, respectively). The intermediate coordinates may in particular be determined using the following equations derived from equation (4):

$$\begin{cases} s_x = (i_x - SPE_x) - C_{elmX} \left\lfloor \dfrac{i_x - SPE_x}{C_{elmX}} \right\rfloor \\ s_y = (i_y - SPE_y) - C_{elmY} \left\lfloor \dfrac{i_y - SPE_y}{C_{elmY}} \right\rfloor \end{cases} \quad (7)$$

The coordinates ($SPE_x$; $SPE_y$) of the processing units 200 in the chosen coordinate system may be predefined before the start-up of the processor 100 or may be modified dynamically during the operation of the processor. Equation (7) may be rewritten in the form:

$$\begin{cases} s_x = (i_x - SPE_x) - C_{elmX} \left\lfloor \dfrac{i_x}{C_{elmX}} - \dfrac{SPE_x}{C_{elmX}} \right\rfloor \\ s_y = (i_y - SPE_y) - C_{elmY} \left\lfloor \dfrac{i_y}{C_{elmY}} - \dfrac{SPE_y}{C_{elmY}} \right\rfloor \end{cases} \quad (8)$$

Because of the definition of the fractional part of an element, it is possible to write:

$$\left\lfloor \dfrac{i_x}{C_{elmX}} - \dfrac{SPE_x}{C_{elmX}} \right\rfloor = \begin{cases} \left\lfloor \dfrac{i_x}{C_{elmX}} \right\rfloor & \text{if } \left\{\dfrac{i_x}{C_{elmX}}\right\} \geq \left\{\dfrac{SPE_x}{C_{elmX}}\right\} \\ \left\lfloor \dfrac{i_x}{C_{elmX}} \right\rfloor - 1 & \text{if } \left\{\dfrac{i_x}{C_{elmX}}\right\} < \left\{\dfrac{SPE_x}{C_{elmX}}\right\} \end{cases} \quad (9.1)$$

$$\left\lfloor \dfrac{i_y}{C_{elmY}} - \dfrac{SPE_y}{C_{elmY}} \right\rfloor = \begin{cases} \left\lfloor \dfrac{i_y}{C_{elmY}} \right\rfloor & \text{if } \left\{\dfrac{i_y}{C_{elmY}}\right\} \geq \left\{\dfrac{SPE_y}{C_{elmY}}\right\} \\ \left\lfloor \dfrac{i_y}{C_{elmY}} \right\rfloor - 1 & \text{if } \left\{\dfrac{i_y}{C_{elmY}}\right\} < \left\{\dfrac{SPE_y}{C_{elmY}}\right\} \end{cases} \quad (9.2)$$

In equations 9.1 and 9.2, the notation {A} designates the absolute value of A.

Moreover, as $$\dfrac{i_x}{C_{elmX}}$$

satisfies:

$$\dfrac{i_x}{C_{elmX}} \geq \left\{\dfrac{SPE_x}{C_{elmX}}\right\} = i_x \bmod C_{elmX} \geq SPE_x \quad (10)$$

The weight-coefficient address $A_w$ that a given SPE processing unit of coordinates ($SPE_x$, $SPE_y$) must read on the output bus of the routing unit 202 may be determined depending on ($SPE_x$, $SPE_y$) and ($i_x$, $i_y$) using the following equations in step 602:

$$A_W = W_x + C_{elmX} W_y \quad (11)$$

$$W_x = \begin{cases} i_x \bmod C_{elmX} - SPE_x & \text{if } i_x \bmod C_{elmX} \geq SPE_x \\ i_x \bmod C_{elmX} - SPE_x + C_{elmX} & \text{if } i_x \bmod C_{elmX} < SPE_x \end{cases}$$

$$W_y = \begin{cases} i_y \bmod C_{elmY} - SPE_y & \text{if } i_y \bmod C_{elmY} \geq SPE_y \\ i_y \bmod C_{elmY} - SPE_y + C_{elmY} & \text{if } i_y \bmod C_{elmY} < SPE_y \end{cases}$$

It should be noted that the computation of the weight-coefficient address $A_w$ for each processing unit uses the same value of the terms $i_x \bmod C_{elmX}$ and $i_y \bmod C_{elmY}$, whatever the processing unit (i.e. these terms do not depend on the processing unit).

On reception of an event by the input matrix 11, the processor 100 is configured to transmit, to each SPE processing unit (200), a weight coefficient defined by the address in the data bus 7 and to associate this weight coefficient with a neuron (coefficient of the convolution kernel 14) and therefore with an integration value (integration value of the spikes originating from the same inputs weighted by the weight coefficients associated with the spikes). The integration value associated with a weight coefficient of address $A_w$ is defined by an integration address $A_I$ that is determined in step 502 of FIG. 12.

The processing block that computes the weight-coefficient address in each convolution module 20 may be implemented in the form of a combinational circuit comprising adder blocks and comparator blocks for implementing equations 11. In one embodiment, this processing block may form part of the pre-processor 203.

For each weight-coefficient address $A_w$, the corresponding integration address $A_I$ may be determined depending on the coordinates ($SPE_x$; $SPE_y$) of the processing unit in the chosen coordinate system and depending on the coordinates ($i_x$; $i_y$) of the input neuron on the input map 11.

To do this, the corresponding output coordinates Ox and Oy in the coordinate system (X, Y) on the output map may be determined depending on the coordinates of the processing unit SPEx and SPEy along the X-axis and the Y-axis, respectively, using the following equation, which is derived from equations (3) and (4):

$$\begin{cases} o_x = SPE_x + C_{elmX} \left\lfloor \dfrac{i_x - SPE_x}{C_{elmX}} \right\rfloor \\ o_y = SPE_y + C_{elmY} \left\lfloor \dfrac{i_y - SPE_y}{C_{elmY}} \right\rfloor \end{cases} \quad (12)$$

Equation (12) may be rewritten in the form:

$$o_x = \begin{cases} SPE_x + C_{elmX} \left\lfloor \dfrac{i_x}{C_{elmX}} \right\rfloor & \text{if } i_x \bmod C_{elmX} \geq SPE_x \\ SPE_x + C_{elmY} \left( \left\lfloor \dfrac{i_x}{C_{elmX}} \right\rfloor - 1 \right) & \text{if } i_x \bmod C_{elmX} < SPE_x \end{cases} \quad (13.1)$$

and, $$o_y = \begin{cases} SPE_y + C_{elmY} \left\lfloor \dfrac{i_y}{C_{elmY}} \right\rfloor & \text{if } i_y \bmod C_{elmY} \geq SPE_y \\ SPE_y + C_{elmY} \left( \left\lfloor \dfrac{i_y}{C_{elmY}} \right\rfloor - 1 \right) & \text{if } i_y \bmod C_{elmY} < SPE_y \end{cases} \quad (13.2)$$

To determine the integration address $A_I$ depending on the output coordinates $o_x$ and $o_y$, the processor determines $$\left\lfloor \dfrac{o_x}{C_{elmX}} \right\rfloor : \left\lfloor \dfrac{o_x}{C_{elmX}} \right\rfloor = \begin{cases} \left\lfloor \dfrac{i_x}{C_{elmX}} \right\rfloor & \text{if } i_x \bmod C_{elmX} \geq SPE_x \\ \left\lfloor \dfrac{i_x}{C_{elmX}} \right\rfloor - 1 & \text{if not} \end{cases}$$

The integration address $A_I$ may then be defined by the 3 following equations:

$$A_I = I_x + \left\lfloor \dfrac{O_{elmx}}{C_{elmX}} \right\rfloor I_y \quad (15.1)$$

$$I_x = \begin{cases} \left\lfloor \dfrac{i_x}{C_{elmX}} \right\rfloor & \text{if } i_x \bmod C_{elmX} \geq SPE_x \\ I_x = \left\lfloor \dfrac{i_x}{C_{elmX}} \right\rfloor - 1 & \text{if } i_x \bmod C_{elmX} < SPE_x \end{cases} \quad (15.2)$$

$$I_y = \begin{cases} \left\lfloor \dfrac{i_y}{C_{elmY}} \right\rfloor & \text{if } y \bmod C_{elmY} \geq SPE_y \\ I_y = \left\lfloor \dfrac{i_y}{C_{elmY}} \right\rfloor - 1 & \text{if } i_y \bmod C_{elmY} < SPE_y \end{cases} \quad (15.3)$$

Thus, there are a finite number of possible integration addresses $A_I$ (4 in the preceding embodiment). In one embodiment, the processor 100 may compute the possible integration addresses for all the processing units (200) using an integration-address-computation function. Each SPE processing unit (200) may then be configured to select the integration-address value right for the weight-coefficient address $A_w$ among the available values.

The value of the output addresses OUT is different for each processing unit. For each weight-coefficient address $A_w$, the output address OUT defined by the output coordinates $o_x$ and $o_y$, may be determined in step 503 of FIG. 12 on the basis of equations (13.1) and (13.2), using the following formulation:

$$o_x = \begin{cases} SPE_x + C_{elmX} \left\lfloor \dfrac{i_x}{C_{elmX}} \right\rfloor & \text{if } i_x \bmod C_{elmX} \geq SPE_x \\ SPE_x + C_{elmY} \left\lfloor \dfrac{i_x}{C_{elmX}} \right\rfloor - C_{elmX} & \text{if } i_x \bmod C_{elmX} < SPE_x \end{cases} \quad (16)$$

and, $$o_y = \begin{cases} SPE_y + C_{elmY} \left\lfloor \dfrac{i_y}{C_{elmY}} \right\rfloor & \text{if } i_y \bmod C_{elmY} \geq SPE_y \\ SPE_y + C_{elmY} \left\lfloor \dfrac{i_y}{C_{elmY}} \right\rfloor - C_{elmY} & \text{if } i_y \bmod C_{elmY} < SPE_y \end{cases} \quad (17)$$

The terms $$C_{elmX} \left\lfloor \dfrac{i_x}{C_{elmX}} \right\rfloor \text{ and } C_{elmX} \left\lfloor \dfrac{i_y}{C_{elmY}} \right\rfloor$$

are common to all the processing units 200 and may therefore be computed by a processing unit of the processor that is common to all the processing units.

Figure 13:
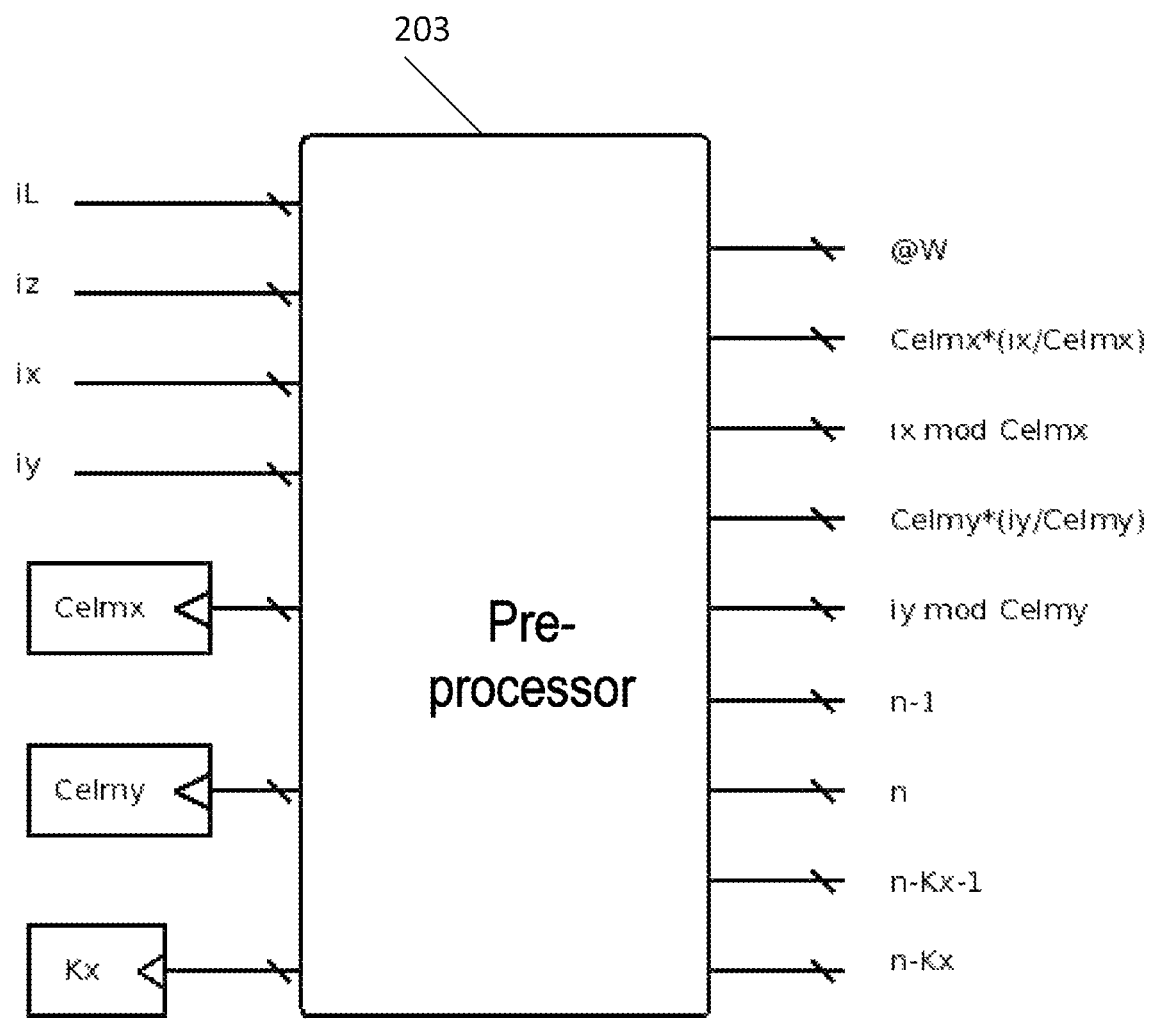
FIG. 13 is a schematic showing the inputs/outputs of the pre-processor included in each processing module, according to certain embodiments.

FIG. 13 is a schematic showing the inputs/outputs of the pre-processor 203 included in each processing module 20, according to certain embodiments.

The pre-processor 203 offloads, for all the processing units, some of the operations to be carried out on the coordinates of a neuron on the input map ($i_x$ and $i_y$) in the coordinate system (X, Y).

The pre-processor determines a set of quantities able to be distributed in parallel to all the SPE processing units (200), and to be used by each processing unit to compute certain parameters such as the computation of the integration address $A_I$, and of the output address OUT.

In certain embodiments, the pre-processor 203 receives as input:
- the input coordinates $i_x$ and $i_y$ on the input map 11;
- the number $C_{elmX}$ of elements of the convolution matrix along the X-axis and
- the number $C_{elmY}$ of elements of the convolution matrix along the Y-axis.

The pre-processor 203 may also receive as input the coefficient $K_x$.

The quantities computed by the pre-processor and able to be used in parallel by the processing units, in particular to compute the weight-coefficient address $A_w$, the integration address $A_I$, and the output address OUT may comprise the 8 following outputs:

1. $i_x \bmod C_{elmX}$

2. $i_y \bmod C_{elmY}$

3. $C_{elmX} * \left\lfloor \dfrac{i_x}{C_{elmX}} \right\rfloor$

4. $C_{elmY} * \left\lfloor \dfrac{i_y}{C_{elmY}} \right\rfloor$

5. $n = K_x \left\lfloor \dfrac{i_y}{C_{elmY}} \right\rfloor + \left\lfloor \dfrac{i_x}{C_{elmX}} \right\rfloor = \left\lfloor \dfrac{i_y}{C_{elmY}} \right\rfloor \left\lfloor \dfrac{I_{elmX}}{C_{elmX}} \right\rfloor + \left\lfloor \dfrac{i_x}{C_{elmX}} \right\rfloor$ 6. $n - 1$ 7. $n - K_x$ 8. $n - K_{x-1}$ The computation carried out by the pre-processor may be carried out in parallel without changing the properties of the processing module (for example, spatial parallelism and/or constant processing time).

In one embodiment, the pre-processor 203 may be implemented in the form of a combinational circuit.

Figure 14:
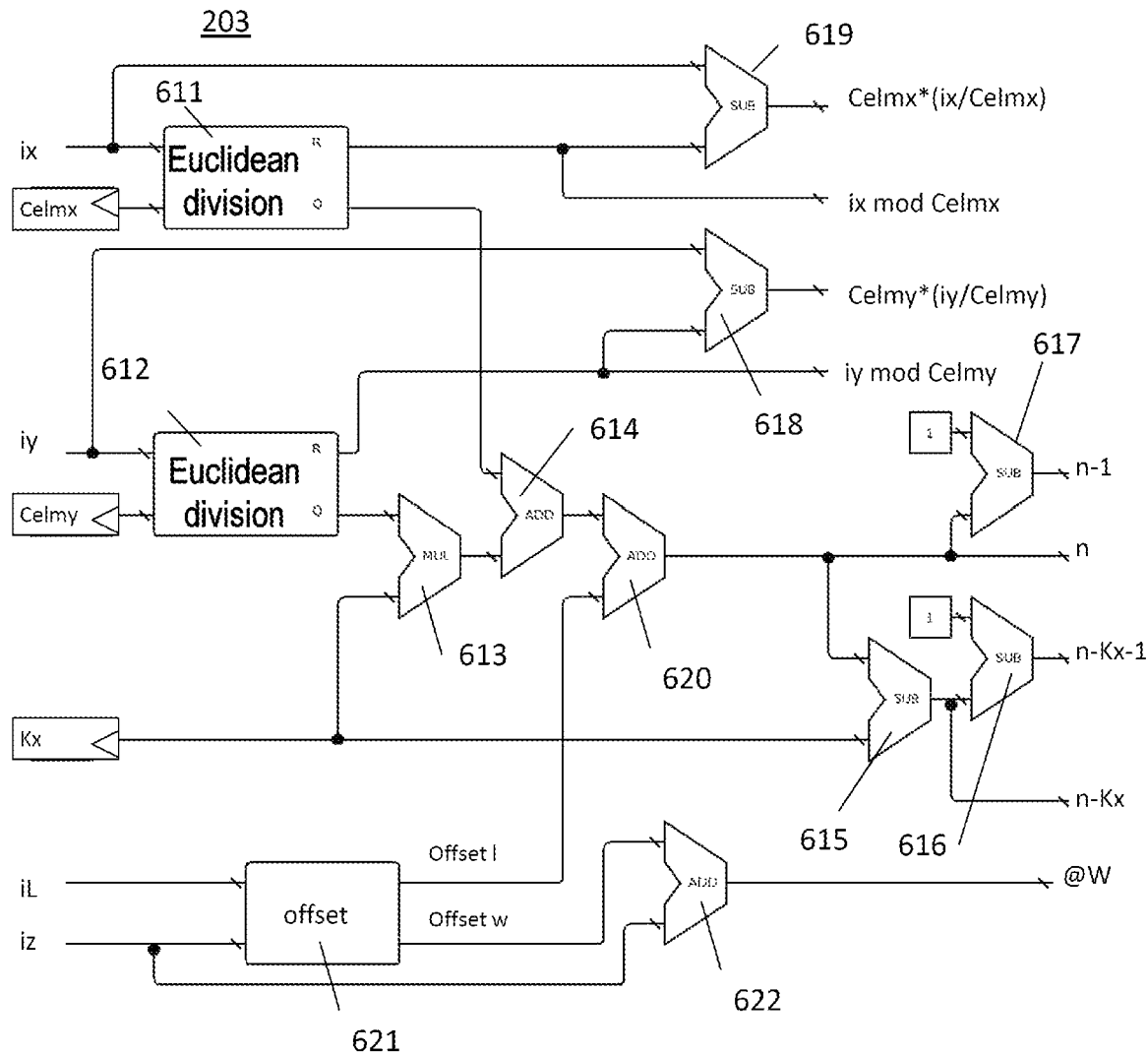
FIG. 14 shows a combinational circuit used to implement the pre-processor, according to one embodiment.

FIG. 14 is a combinational circuit used to implement the pre-processor 203, according to one embodiment in which the computations are not "pipelined".

In this embodiment, the pre-processor 203 comprises two Euclidean-division blocks 611 and 612:

the Euclidean-division block 611 is configured to carry out the Euclidean division of $i_x$ by $C_{elmX}$, this delivering the result $R_X = i_x \bmod C_{elmX}$ (output 1) and the quotient $$Q_X = \left\lfloor \frac{i_x}{C_{elmX}} \right\rfloor$$

the Euclidean-division block 612 is configured to carry out the Euclidean division of $i_y$ by $C_{elmY}$, this delivering the result $R_Y = i_y \bmod C_{elmY}$ (output 2) and the quotient $$Q_Y = \left\lfloor \frac{i_y}{C_{elmY}} \right\rfloor$$

The pre-processor 203 may furthermore comprise a set of logic blocks comprising:

a multiplier block 613 for carrying out the multiplication of $K_x$ by $$Q_Y = \left\lfloor \frac{i_y}{C_{elmY}} \right\rfloor,$$

this delivering $$k_x \left\lfloor \frac{i_y}{C_{elmY}} \right\rfloor,$$

an adder block 614 for adding the result of the block 614, $$K_x \left\lfloor \frac{i_y}{C_{elmY}} \right\rfloor,$$

to $Q_X$; the block 64 thus delivers the result $$n = K_x \left\lfloor \frac{i_y}{C_{elmY}} \right\rfloor + \left\lfloor \frac{i_x}{C_{elmX}} \right\rfloor \text{ (output 5)};$$

a subtractor block 615 for subtracting $K_x$ from the result of the adder block 614, this delivering the result $$K_x \left\lfloor \frac{i_y}{C_{elmY}} \right\rfloor + \left\lfloor \frac{i_x}{C_{elmX}} \right\rfloor - K_x = n - k_x \text{ (output 7)};$$

a subtractor block 616 for subtracting the value 1 from the result of the subtractor block 615, this delivering the result $n - K_x - 1$ (output 8);

a subtractor block 617 for subtracting the value 1 from the result of the adder block 614, this delivering the result $$K_x \left\lfloor \frac{i_y}{C_{elmY}} \right\rfloor + \left\lfloor \frac{i_x}{C_{elmX}} \right\rfloor - 1 = n - 1 \text{ (output 6)};$$

a multiplier block 618 for multiplying $C_{elmY}$ and the result $Q_Y$ of the Euclidean-division block 612, this delivering the result $$C_{elmY} * \left\lfloor \frac{i_y}{C_{elmY}} \right\rfloor \text{ (output 4)};$$

a multiplier block 619 for multiplying $C_{elXY}$ and the result $Q_X$ of the Euclidean-division block 612, this delivering the result $$C_{elmX} * \left\lfloor \frac{i_x}{C_{elmX}} \right\rfloor \text{ (output 3)}.$$

In certain embodiments, the computations carried out by the above logic blocks may be carried out instantaneously via look up tables LUTs or memory. Moreover, the parameterizing data represented in the form of registers in the figures may be placed in a memory and dynamically changed depending on the input addresses (for example, to a given layer-component value L corresponds one configuration). For example, in the embodiment of FIG. 14, an offset block 621, represented by a programmable look up table, is used. It delivers as output an offset value I and an offset value W. The offsets I and W are computed depending on the inputs $i_L$ and $i_z$, $i_L$ designating the number of the preceding layer that produced the spike, and are added by an adder block 622 to deliver the address @W. The offset I is added to the output of the adder block 614 using another adder block 620, this delivering the value n.

These values computed by the pre-processor 203 may be used communally by the processing units 200 concerned by the spike to:

Select an integration address $A_j$; and/or
compute the address OUT of the output neuron; and/or
Manage potential edge effects.

The routing unit 202 is configured to distribute the values of the weight coefficients (coefficients of the convolution kernel 12) to the processing units 200 depending on $i_x \bmod C_{elmX}$ and $i_y \bmod C_{elmY}$ (these two quantities are common to all the processing units).

The weight-coefficient memory 201 may use a segmentation of the output map 14 and equation (11): $A_W = W_x + C_{elmX} W_y$, with $W_x$ that depends on $i_x \bmod C_{elmX}$ and $SPE_x$ whereas $W_y$ depends on $i_y \bmod C_{elmY}$. An offset may furthermore be applied depending on the components L and Z.

In one embodiment, the routing unit 202 and the pre-processor 203 may be used to implement the computation of equation 11 and distribute this computation.

The positions of the processing units 200, defined by $SPE_x$ and $SPE_y$, may be chosen so as to simplify access to the weight coefficients of the convolution kernel 12. Various methods for reading or conveying data may be implemented to access and convey the data in parallel, in a controlled way.

Each SPE processing unit (200) may implement a set of internal functions as shown in the embodiment of FIG. 8, in particular in order to compute the integration address using equation (15):

$$A_I = I_x + \left\lfloor \frac{I_{elmX}}{C_{elmX}} \right\rfloor I_y,$$

with $I_x$ that depends on $$\left\lfloor \frac{i_x}{C_{elmX}} \right\rfloor$$

and $I_y$ that depends on $$\left\lfloor \frac{i_y}{C_{elmY}} \right\rfloor:$$

If $i_x \bmod C_{elmX} \geq SPE_x$, $$I_x = \left\lfloor \frac{i_x}{C_{elmX}} \right\rfloor;$$

If $i_x \bmod C_{elmX} < SPE_x$, $I_x = -1$;
If $i_y \bmod C_{elmY} \geq SPE_y$, $$I_y = \left\lfloor \frac{i_y}{C_{elmY}} \right\rfloor.$$

If $i_y \bmod C_{elmY} \geq SPE_y$, $$I_y = \left\lfloor \frac{i_y}{C_{elmY}} \right\rfloor.$$

For each point of coordinates ($i_x$, $i_y$), there are 4 possibilities depending on the result of the comparison between $i_x \bmod C_{elmX}$ and $SPE_x$ on the one hand and $i_y \bmod C_{elmY}$ and $SPE_y$ on the other hand. Depending on the result of the comparison, the integration-address-computation function 2001 may return one of the 4 following values (corresponding to outputs 5 to 8 of the pre-processor):
n;
n−1;
n−k$_x$;
n−k$_x$−1.

The verification of the conditions between $i_x \bmod C_{elmX}$ and $SPE_x$ on the one hand and $i_y \bmod C_{elmY}$ and $SPE_y$ on the other hand may be implemented by comparison blocks of each processing unit (200).

Figure 15:
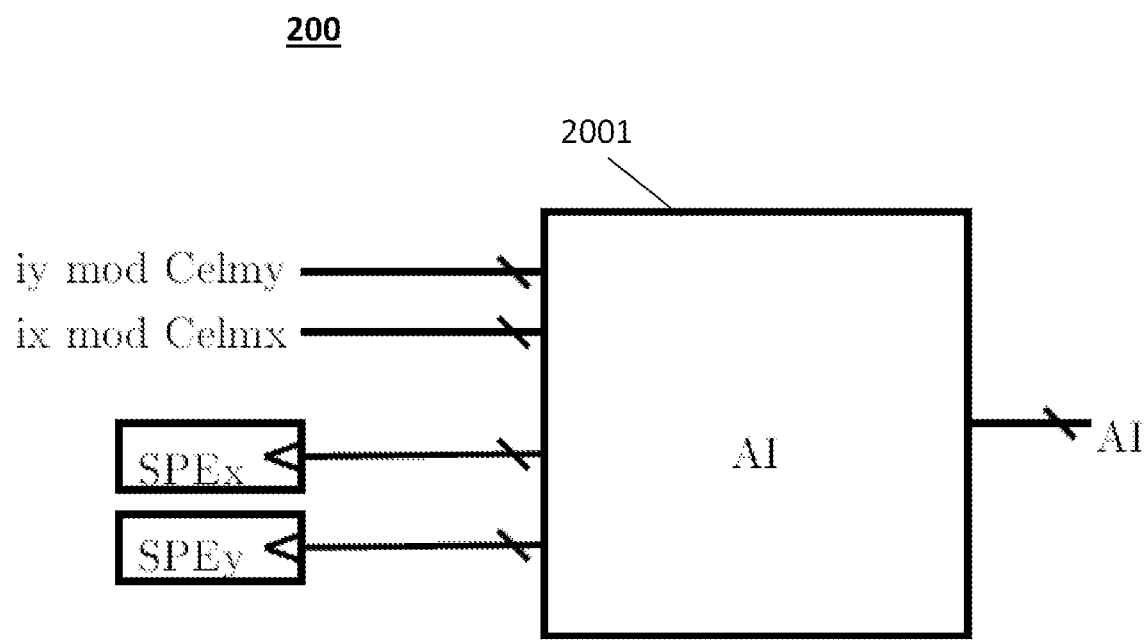
FIG. 15 is a schematic showing the inputs/outputs of the integration-address-computation function, according to certain embodiments.

FIG. 15 is a schematic showing the inputs/outputs of the integration-address-computation function 2001, according to certain embodiments.

In these embodiments, the integration-address-computation function 2001 receives as input the following parameters:
$i_x \bmod C_{elmX}$;
$i_y \bmod C_{elmY}$;
$SPE_x$; and
$SPE_y$.

On the basis of these input parameters, the integration-address-computation function 2001 may determine the associated integration address.

In one embodiment, the integration-address-computation function 2001 may be implemented in the form of a combinational circuit.

Figure 16:
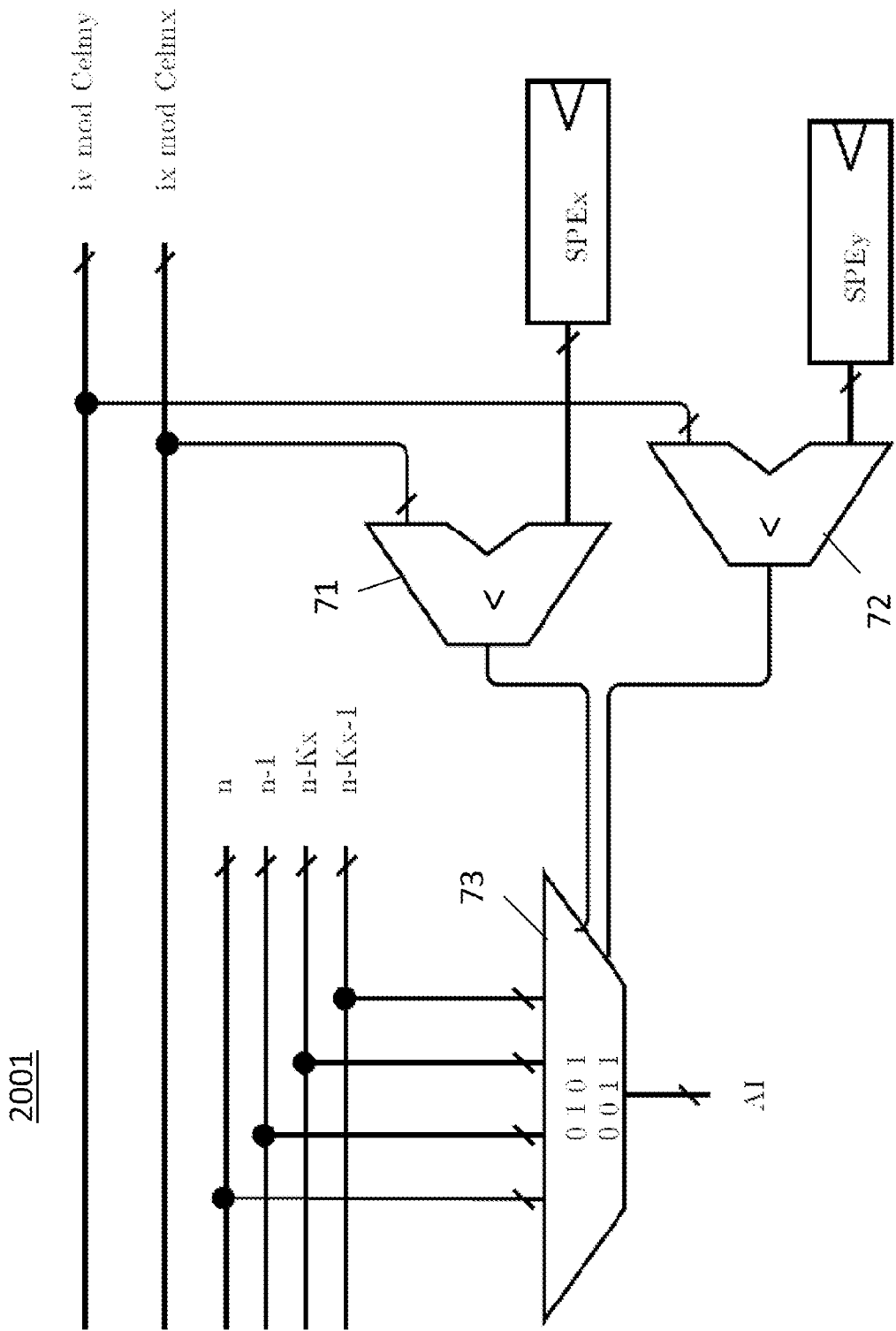
FIG. 16 shows a combinational circuit used to implement the integration-address-computation function implemented in each processing unit, according to certain embodiments.

FIG. 16 is a combinational circuit used to implement the integration-address-computation function 2001 of each processing unit 200, according to certain embodiments.

The integration-address-computation function 2001 may comprise:
a first comparator 71 able to determine whether $i_x \bmod C_{elmX}$ is higher than or equal to $SPE_x$, the result delivered as output being set to a first value if this condition is met ($i_x \bmod C_{elmX} \geq SPE_x$) and to a second value if this condition is not met ($i_x \bmod C_{elmX} < SPE_x$);
a second comparator 72 able to determine whether $i_y \bmod C_{elmY}$ is higher than or equal to $SPE_y$, the result delivered as output being set to the first value if this condition is met ($i_y \bmod C_{elmY} \geq SPE_y$) and to the second value if this condition is not met ($i_y \bmod C_{elmY} < SPE_y$);
a selector 73 able to assign one of the values computed beforehand by the pre-processor 203 among the values n, n−1, n−K$_x$, n−K$_x$−1 to the integration address $A_I$ depending on the result delivered by the comparators 71 and 72.

The output function 2004 (OUT) of each processing unit 200 is intended to communicate with the other processing modules 20 and therefore with the other convolution layers of the neural network. The output function 2004 (OUT) of each processing unit 200 is intended to communicate the coordinates ($o_x$, $o_y$) of the address on the output map 14 of the neurons that are triggered.

Figure 17:
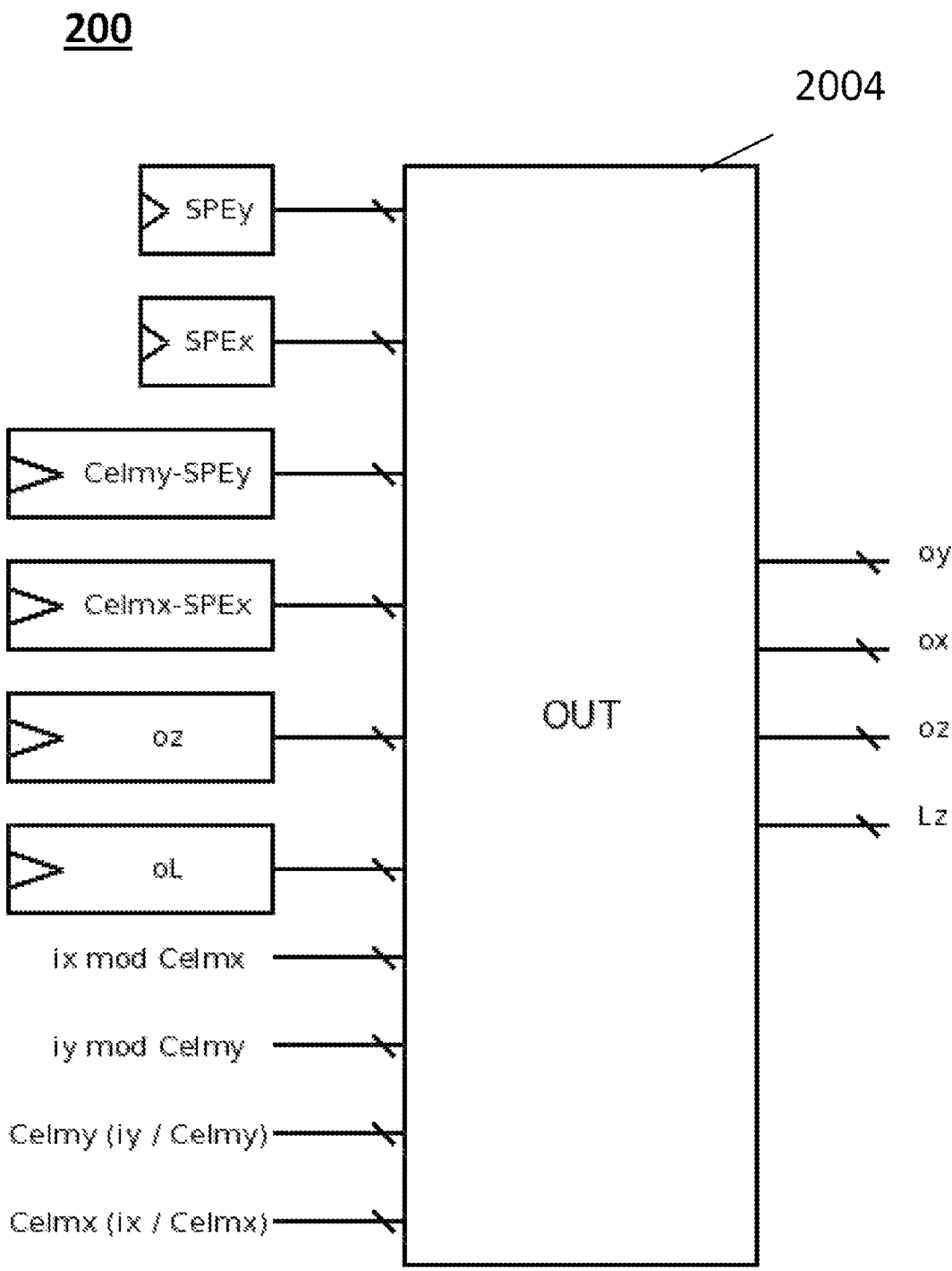
FIG. 17 is a schematic showing the inputs/outputs of the output function, according to certain embodiments.

FIG. 17 is a schematic showing the inputs/outputs of the output function 2004, according to certain embodiments;
In these embodiments, the output function 2004 receives as input the following parameters:
$C_{elmX} - SPE_x$;
$C_{elmY} - SPE_y$;
$SPE_x$;
$SPE_y$;
in embodiments using coordinates X, Y, Z in a 3-D coordinate system, the output on the output map may also have a Z component denoted $o_z$ or z_out, and an L component (the layer component);
$i_x \bmod C_{elmX}$;
$i_y \bmod C_{elmY}$;

$$C_{elmX} * \frac{i_x}{C_{elmX}};$$

$$C_{elmY} * \frac{i_y}{C_{elmY}}.$$

On the basis of these input parameters, the output-computation function 2004 determines the coordinates ($o_x$, $o_y$) of the address on the output map of each triggered neuron by implementing the following equations:
If $i_x \bmod C_{elmX} \geq SPE_x$:

$$o_x = SPE_x + C_{elmX} \left\lfloor \frac{i_x}{C_{elmX}} \right\rfloor. \quad (19.1)$$

Else, if $i_x \bmod C_{elmX} < SPE_x$:

$$o_x = SPE_x + C_{elmX} \left\lfloor \frac{i_x}{C_{elmX}} \right\rfloor - C_{elmX}; \quad (19.2)$$

If $i_y \bmod C_{elmY} \geq SPE_y$:

$$o_y = SPE_y + C_{elmY}\left\lfloor \frac{i_y}{C_{elmY}} \right\rfloor; \quad (20.1)$$

If $i_y \bmod C_{elmY} < SPE_y$:

$$o_y = SPE_y + C_{elmY}\left\lfloor \frac{i_y}{C_{elmY}} \right\rfloor - C_{elmY}. \quad (20.2)$$

In equations 19.1, 19.2, 20.1 and 20.2, the terms common to all the processing units 200 (i.e. that are not dependent on data specific to each processing unit) comprise the terms $$C_{elmX}\left\lfloor \frac{i_x}{C_{elmX}} \right\rfloor \text{ and } C_{elmY}\left\lfloor \frac{i_y}{C_{elmY}} \right\rfloor.$$

These terms may be computed by the common pre-processor 203 provided in the processing module 20 of the processing units.

The other terms may be computed by functions or blocks internal to each processing unit 200.

In one embodiment, the output function 2004 may be implemented in the form of a combinational circuit.

Figure 18:
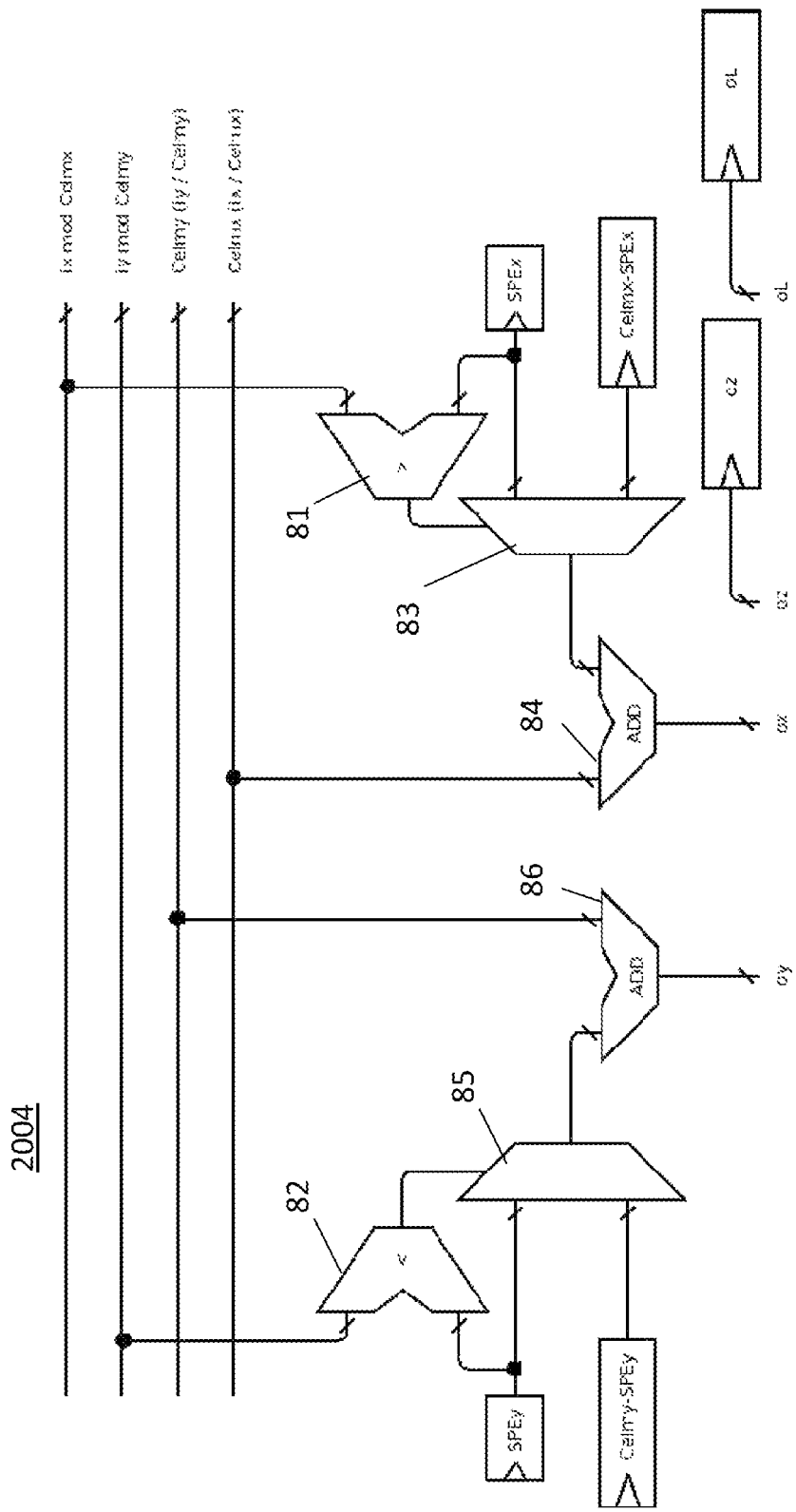
FIG. 18 shows a combinational circuit used to implement the output function of each processing unit, according to one embodiment.

FIG. 18 shows a combinational circuit used to implement the output function 2004 of each processing unit 200, according to one embodiment.

In the embodiment of FIG. 18, the output-computation function comprises:

- a first comparator 81 able to determine whether $i_x \bmod C_{elmX}$ is higher than or equal to $SPE_x$, the result delivered as output being set to a first value if this condition is met ($i_x \bmod C_{elmX} \geq SPE_x$) and to a second value if this condition is not met ($i_x \bmod C_{elmX} < SPE_y$);
- a second comparator 82 able to determine whether $i_y \bmod C_{elmY}$ is higher than or equal to $SPE_y$, the result delivered as output being set to the first value if this condition is met ($i_y \bmod C_{elmY} \geq SPE_y$) and to the second value if this condition is not met ($i_y \bmod C_{elmY} < SPE_y$);
- a first multiplexer 83 for selecting the value $SPE_x$ if the first comparator 81 delivers the first value (i.e. condition met) or else the value $C_{elmX}-SPE_x$ if the first comparator 82 delivers the second value (i.e. condition met);
- a first adder 84 configured to add $SPE_x$ and $$C_{elmX}\left(\frac{i_x}{C_{elmX}}\right)$$

if the multiplexer 83 selects $SPE_x$ (i.e. condition met), this delivering $$o_x = SPE_x + C_{elmX}\left\lfloor \frac{i_x}{C_{elmX}} \right\rfloor,$$

or to add $C_{elmX}-SPE_x$ and $$C_{elmX}\left(\frac{i_x}{C_{elmX}}\right)$$

if the first multiplexer 83 selects $C_{elmX}-SPE_x$ (i.e. condition not met), this delivering $$o_x = SPE_x + C_{elmX}\left\lfloor \frac{i_x}{C_{elmX}} \right\rfloor - C_{elmX};$$

a second multiplexer 85 for selecting the value $SPE_y$ if the second comparator 82 delivers the first value (i.e. condition met) or else the value $C_{elmY}-SPE_y$ if the second comparator 82 delivers the second value (i.e. condition met);

a second adder 86 configured to add $SPE_y$ and $$C_{elmY}\left(\frac{i_y}{C_{elmY}}\right)$$

if the second multiplexer 85 selects $SPE_y$ (i.e. condition met), this delivering $o_y = SPE_y +$ $$C_{elmY}\left\lfloor \frac{i_y}{C_{elmY}} \right\rfloor$$

or to add $C_{elmY}-SPE_y$ and $$C_{elmY}\left(\frac{i_y}{C_{elmY}}\right)$$

if the second multiplexer 85 selects $C_{elmY}-SPE_y$ (i.e. condition not met), this delivering $$o_y = SPE_y + C_{elmY}\left\lfloor \frac{i_y}{C_{elmY}} \right\rfloor - C_{elmY}.$$

The activation function 2000 of each processing unit 200 is configured to activate the processing unit 200 and to apply an input value E.

Figure 19:
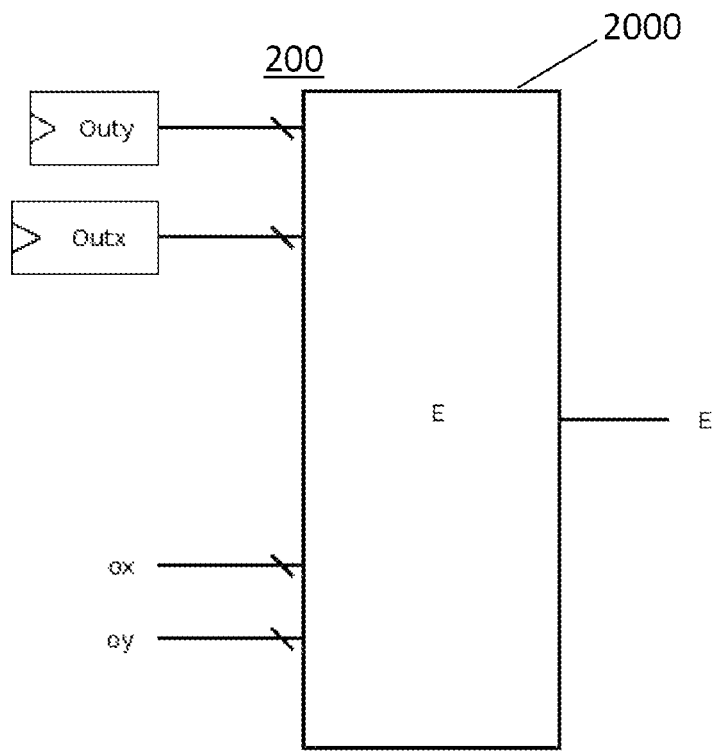
FIG. 19 shows the inputs/outputs of the activation function, according to one embodiment.

FIG. 19 shows the inputs/outputs of the activation function 2000, according to one embodiment; In this embodiment, the activation function 2000 receives as input the following parameters:

The size $O_{elmx}$ in x of the output matrix of the convolution layer, which is given by $O_{elmx} = I_{elmX} - C_{elmX} + 1$;
The size $O_{elmy}$ in y of the output matrix of the convolution layer, which is given by $O_{elmy} = I_{elmY} - C_{elmY} + 1$;
$o_x$;
$o_y$.

Although the above description of certain embodiments has mainly been given in relation to a coordinate system of two dimensions X and Y, by way of nonlimiting example, those skilled in the art will understand that the invention is applicable to any other coordinate system and in particular to a coordinate system of three dimensions, X, Y and Z (3-D representation, for example of color images). In such a three-dimensional coordinate system (X, Y and Z), the activation function 2000 may in addition comprise an input $i_z$ (coordinates in z of the input image) defined with respect to the three-dimensional coordinate system X, Y and Z.

The activation function 2000 may deliver as output the parameter E having a binary value (0 or 1) depending on the following conditions:

If $o_x < O_{elmx}$ and $o_y < O_{elmy}$, E=1;
Else if $o_x \geq O_{elmx}$ or $o_y \geq O_{elmy}$, E=0.

In one embodiment, the output function 200 may be implemented in the form of a combinational circuit.

Figure 20:
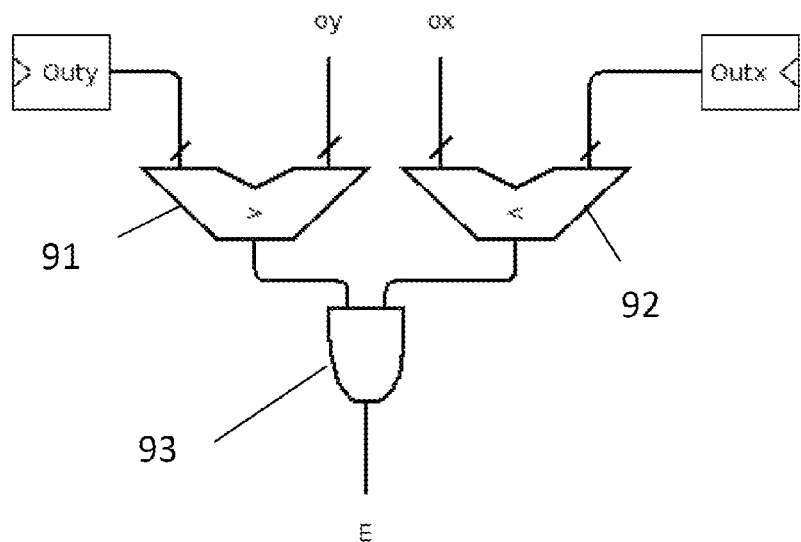
FIG. 20 is a combinational circuit showing an implementation of the activation function, according to one example embodiment.

FIG. 20 is a combinational representation (in the form of a combinational circuit) of the activation function 2000, according to one example embodiment.

In this example embodiment, the activation function 2000 is implemented in the form of a circuit comprising:

- a first comparator 91 able to determine whether the output coordinate $o_x$ in X is strictly lower than $O_{elmx}$ ($o_x < O_{elmx}$), the result delivered as output being set to a first value (e.g. "1") if this first condition is met and to a second value (e.g. "0") if the first condition is not met (i.e. $o_x \geq O_{elmx}$);
- a second comparator 92 able to determine whether the output coordinate $o_x$ in Y is strictly lower than $O_{elmy}$ ($o_y < O_{elmy}$), the result delivered as output being set to the first value if this second condition is met and to the second value if the second condition is not met (i.e. $o_y \geq O_{elmy}$);
- a first logic block 93 for delivering as output the value 1 if the first condition and the second condition are met (if the output of the first comparator 91 and the output of the second comparator 92 have the same first value) or to deliver as output the value 0 if at least one of the first condition and the second condition is not met (i.e. if the output of the first comparator 91 or the output of the second comparator 91 and 92 has the second value); if the first value and the second value are binary, the logic block may be an AND gate).

In certain embodiments, the circuit implementing the activation function 2004 may comprise:

- a third comparator 94 configured to determine whether the maximum coordinate $SPE_{z\_max}$ of the processing unit along a Z-axis orthogonal to the X- and Y-axes is higher than the coordinate on the input map $i_z$ ($SPE_{z\_max} > i_z$), the result delivered as output from the third comparator 94 being set to a first value if the third condition $SPE_{z\_max} > i_z$ is met and to a second value if the third condition is not met (i.e. $SPE_{z\_max} \leq i_z$);
- a fourth comparator 95 configured to determine whether the minimum coordinate $SPE_{z\_min}$ of the processing unit along the Z-axis is lower than the coordinate on the input map $i_z$ ($SPE_{z\_min} < i_z$), the result delivered as output from the fourth comparator 95 being set to a first value if the fourth condition $SP_{z\_min} < i_z$ is met and to a second value if the third condition is not met (i.e. $SPE_{z\_min} \geq i_z$);
- a second logic block 96 for delivering as output the value 1 if the third condition and the fourth condition are met (if the output of the third comparator 94 and the output of the fourth comparator 95 have the same value) or to deliver as output the value 0 if at least one of the third condition and the fourth condition is not met (i.e. if the output of the third comparator 94 or the output of the fourth comparator 95 has the second value); the second logic block 96 may be an AND gate;
- a third logic block 97 for assigning the first value "1" to the parameter E if the output of the second logic block 96 and the output of the third logic block 97 have the first value "1" or to assign the second value "0" to the parameter E if at least one of the output of the second logic block 96 and of the output of the third logic block 97 has the second value "0"; the third logic block 97 may be an AND gate.

Figure 21:
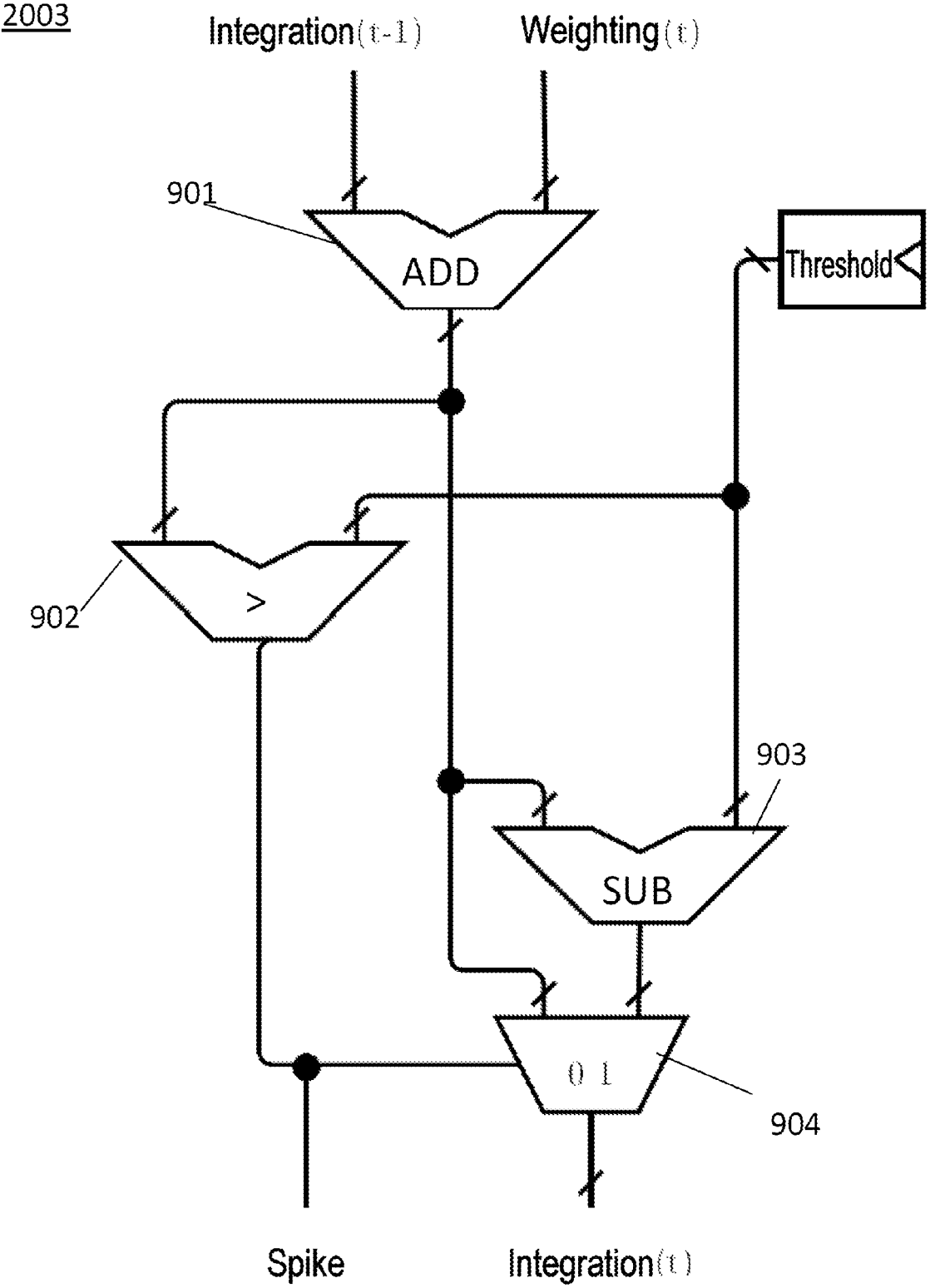
FIG. 21 is a schematic showing an example of implementation of the arithmetic logic unit of each processing unit, according to certain embodiments.

FIG. 21 is a schematic showing an example of the hardware implementation of the arithmetic logic unit ALU 2003 of each SPE processing unit 200, according to certain embodiments; In the example of FIG. 21, the arithmetic logic unit ALU 2003 is configured to compute the output value of each neuron corresponding to the temporal integration at the time t on the basis of the temporal integration at t-1 and of the convolution coefficient (weight coefficient) associated with the time t, according to the IF (Integrate and Fire) neuron model.

In the embodiment of FIG. 21, the arithmetic logic unit ALU 2003 comprises:

- an adder block 901 for summing the temporal integration at t-1 ("Integration (t-1)") and the convolution coefficient at the time t (weight coefficient (t)) and delivering the absolute value of the obtained sum;
- a comparator 902 configured to compare the result of the adder block 901 to a predefined threshold ("threshold");
- a subtractor block 903 configured to subtract the predefined threshold ("threshold") from the result of the adder block 901 if the result of the adder block 901 is strictly higher than the predefined threshold ("threshold");
- a selector 904 for assigning, to the temporal-integration parameter at the time t (Integration(t) or $I_i(t)$), the output value of the subtractor block 903, if the result of the adder block 901 is strictly higher than the predefined threshold ("threshold"); else, if the result of the adder block 901 is lower than or equal to the threshold, the value of the integration $I_i(t)$ is reset to 0 once the neuron emits a spike ("refractory" period).

The output-managing unit 206 of the processing module 20 forms a serialization system with a prioritization unit. It allows the output order of the events to be managed and may be used for pooling functions, and also allows certain events to be ignored. Any output series protocol may be used, for example the AER protocol. The prioritization function may depend on the sought-after function. For example:

Without pooling, the prioritization function may be deterministically arbitrary depending on the addresses of the events;

With pooling, the prioritization function may give priority to events depending on the history of the output events. For "MAX pooling", the output-managing unit 206 may transmit the event only if its address corresponds to the most active address in the pool. For "AVERAGE pooling", the output-managing unit 206 may transmit the event only if the number of events actually transmitted to the pool becomes lower than the average of the number of activations per distinct address in the pool, before prioritization.

Figure 22:
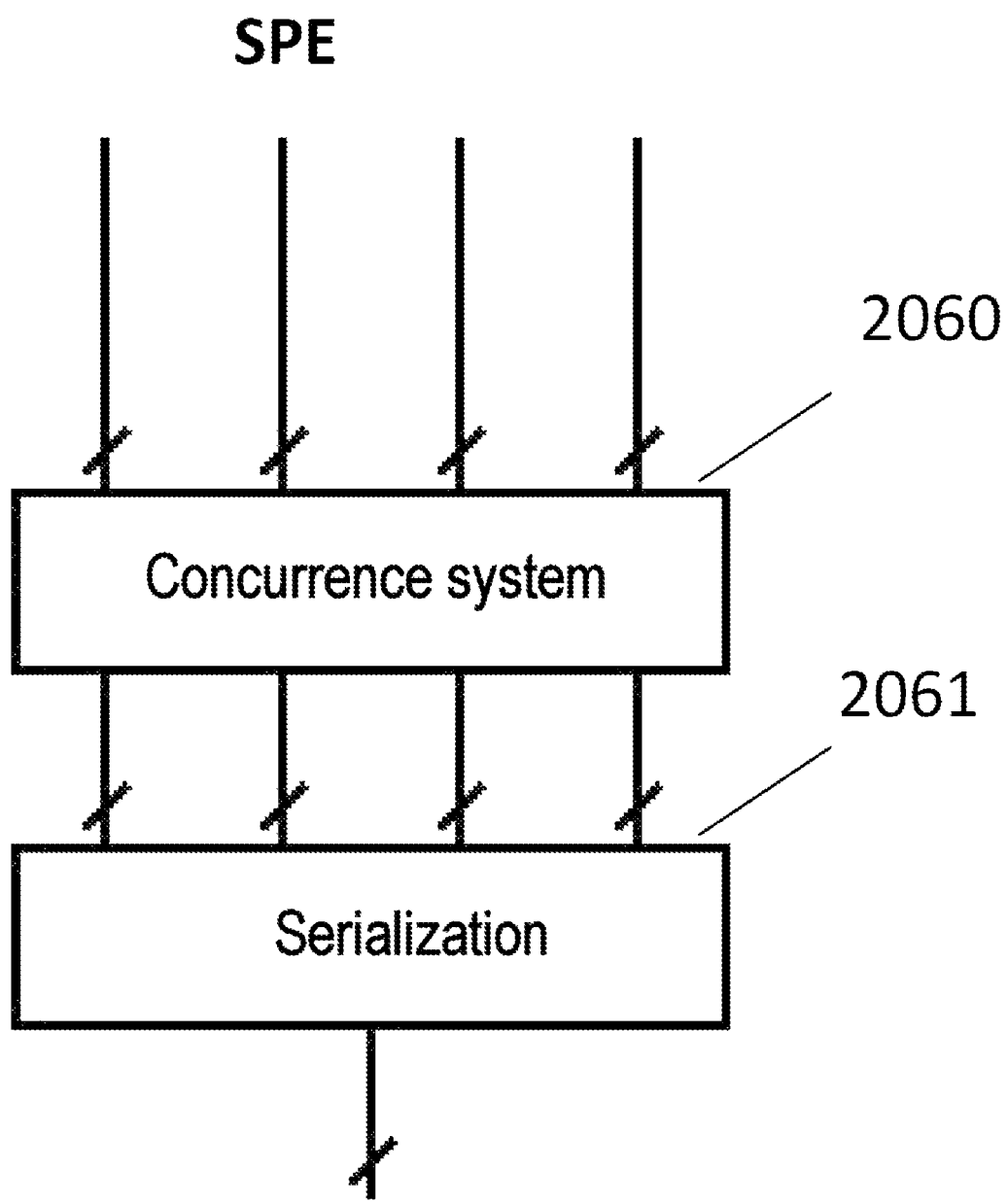
FIG. 22 illustrates one example embodiment of the output-managing unit.

FIG. 22 illustrates one example embodiment of the output-managing unit 206 (PE). This unit may be configured to serialize the outputs of the processing units 200 and/or to create a pooling function.

In the embodiment of FIG. 22, the output-managing unit 206 comprises a concurrence system 2060, configured to manage the concurrence between the output events depending on predefined concurrence rules, and a serialization unit 2061, configured to serialize the output events (represented by an output address ($o_x$, $o_y$)). The output-managing unit 206 receives its input from a parallel data bus and delivers these data as output, one by one, to a series bus, in a predefined order of priority. The data output from the output-managing unit 206 may be delivered to the post-processor 207, in the embodiments in which a post-processor is connected to the output of the output-managing unit 206.

Figure 23:
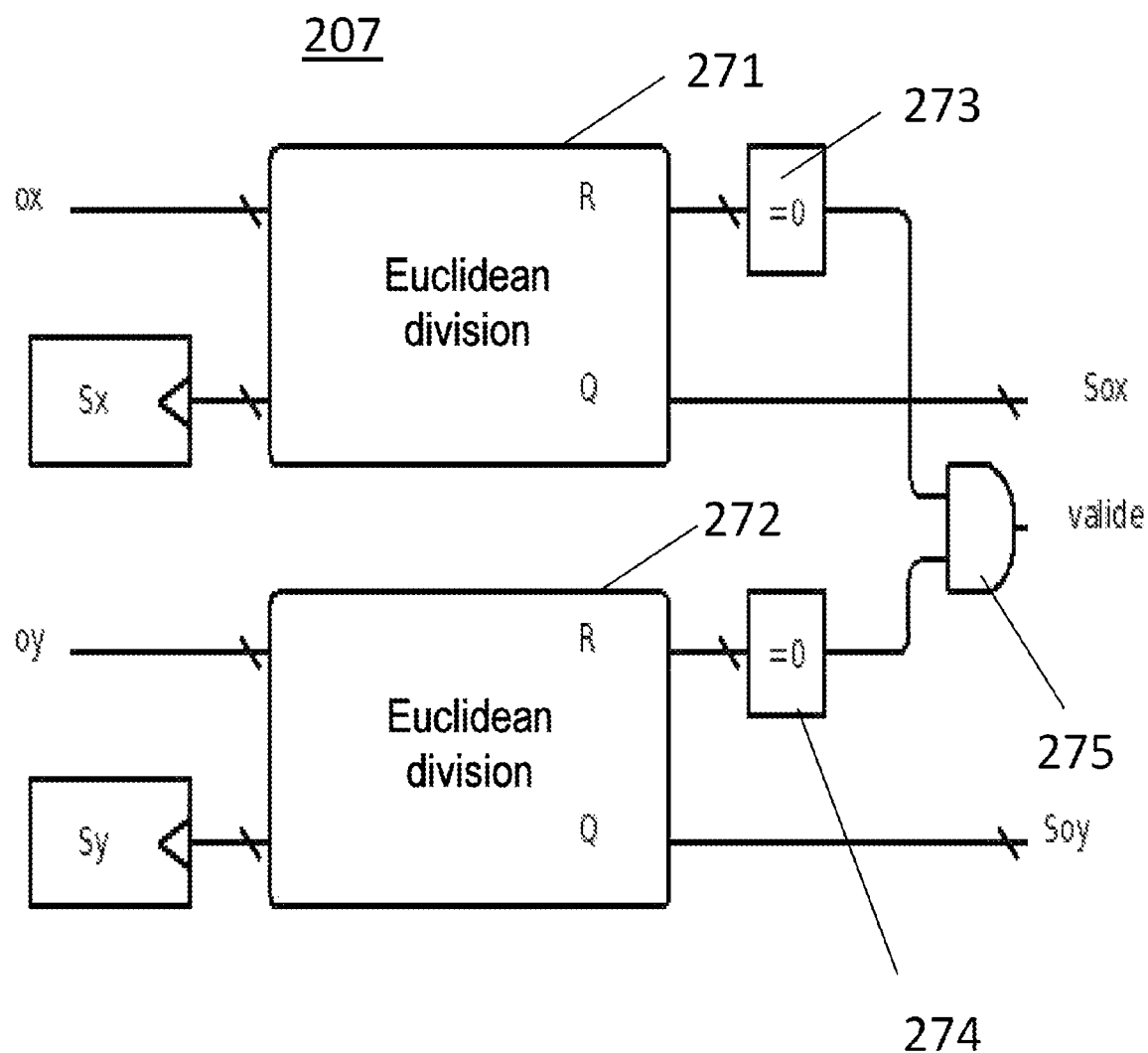
FIG. 23 illustrates one example of implementation of a post-processor in a combinational form.

FIG. 23 illustrates one example of implementation of a post-processor 207 in a combinational form. The post-processor 207 of each processing module may be configured to process all of the output events (defined by an output address), and may for example implement a stride different from 1. The post-processor 207 may modify the address of the output event ($o_x$, $o_y$) or even ignore the output event (in which case it is not transmitted). The post-processor 207 may comprise an arithmetic logic unit ALU for modifying the address of output events that are not ignored. In embodiments in which the post-processor 207 implements strides in the form of a combinational circuit, the ALU may comprise two blocks 271 and 272 for carrying out two Euclidean divisions of each coordinate of the output address $o_x$ and $o_y$ by each corresponding coordinate of the stride $s_x$ and $s_y$, this giving new output coordinates $So_x$ and $So_y$. The post-processor 207 may also comprise blocks 273, 274 and 275 for determining whether the output event thus modified is valid, and may determine a quotient Q for the new value of the coordinates of the address $So_x$ and $So_y$.

Figure 24:
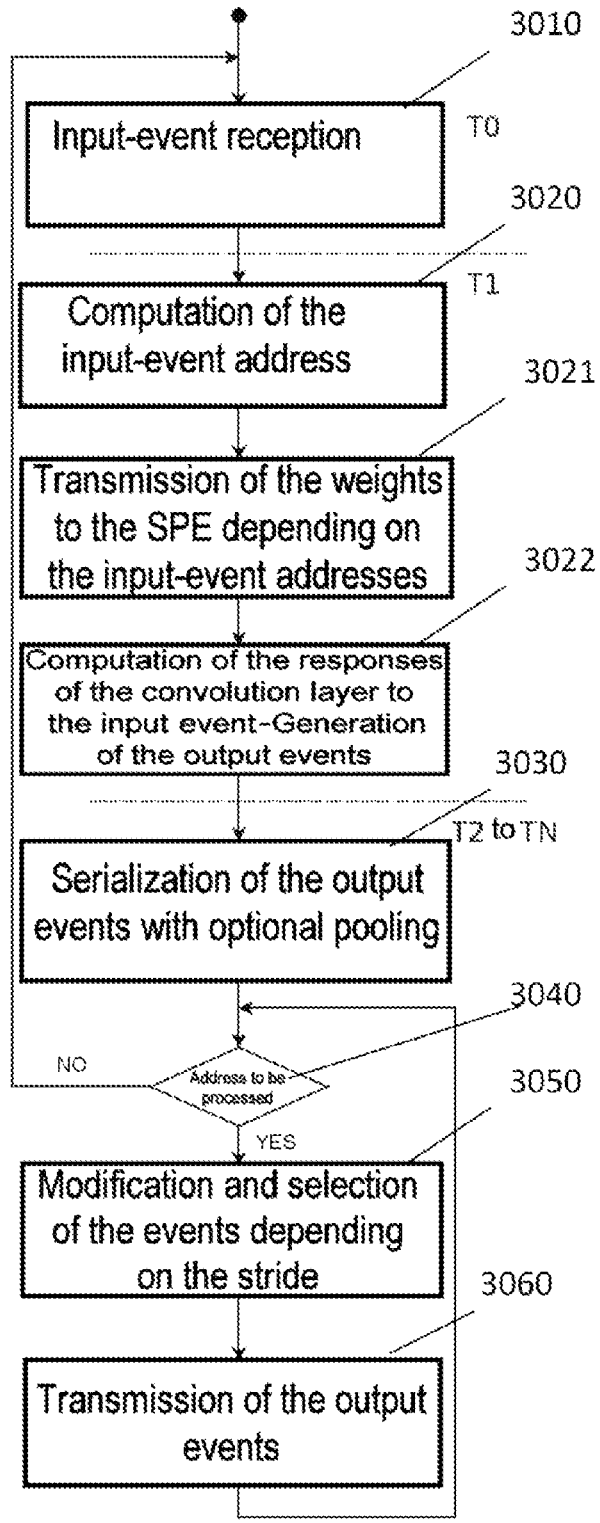
FIG. 24 is a flowchart showing the path of the data through the various components of the processor, according to example embodiments.

FIG. 24 is a flowchart showing the path of the data through the various components of the processor 100, according to the example embodiments of FIGS. 6 and 8.

In step 3010, in response to an input event in the input matrix 11 at the time T0, the input address of the first event is sent to the pre-processor 203. The pre-processor carries out computations that are common to the processing units 200 on the basis of input information ($i_x$, $i_y$), of data relating to the input map $C_{elmX}$ and $C_{elmY}$, and of $K_x$.

In particular, in step 3020, the input address is read and the pre-processor 203 computes the possible integration addresses of the events, n, n−1, n−$K_x$, n−$K_x$−1. At the time T1, the pre-processor transmits the possible integration addresses to the router 202 in order to route the weight coefficients to the processing units 200.

At the time T1, each processing unit 200 receives weight coefficients at the weight-coefficient address $A_w$ computed, for the processing unit, by the routing unit 202 (step 3021). These data are conveyed by the routing unit 202 to the processing units 200 for the computation of the response.

At the same time T1, the responses of the convolution layer to the input event are computed by each processing unit depending on the weight coefficient received and the preceding integration value (which depend on the input spikes) (step 3022).

The following steps take place between the times T2 and TN (serialization of the responses and transmission of the data by the blocks 206, 207, 208).

More precisely, in step 3030, the output events are serialized and where appropriate a pooling function may be applied, in the output-managing unit 206.

If the address is not to be processed (block 3040), the following steps are reiterated once another event is detected.

Else, if the address is to be processed, in step 3050, the output events are modified in the post-processor 207 depending on the stride defined by the vertical and horizontal stride parameters, and which corresponds to the offset between each application of the convolution kernel to the input matrix.

In step 3060, the output events are used for a new iteration of steps 3030 to 3060.

It should be noted that the order of the steps 3010 to 3060 may be different depending on the embodiments, and in particular when at least certain steps are carried out in parallel.

Thus, these steps make it possible:
to transmit to each SPE processing unit (200) of a convolution processing module 20 a weight coefficient defined by a weight-coefficient address $A_w$, and to associate this weight coefficient with a neuron and with an integration value defined by an integration address $A_I$ depending on the coordinates ($SPE_x$; $SPE_y$) of each processing unit, on the coordinates ($i_x$; $i_y$) of the input neuron on the input map 11, and on specificities of the input map (steps 3020 and 3021);
compute, in each processing unit 200, the corresponding output coordinates $o_x$ and $o_y$ on the output map (step 3022); and
compute the value of the output addresses OUT for each processing unit (step 3022).

The processor 100 according to the embodiments guarantees the effectiveness of the neural network whatever the size of the input map (scaling). It moreover has flexibility in terms of topology and of operation, while having an event-processing speed and a performance in terms of footprint, in terms of power consumption and in terms of processing power (its performance is equivalent to that of a CPU/GPU implementation) that allow it to be employed in on-board applications. The processor 100 may in particular be used as a high-performance classification system, in a parallel operating mode, in particular in on-board platforms that are highly constrained (both in terms of footprint and in terms of power consumption).

By implementing sharing of weight coefficients in a convolutional operation, the processing units 200 may read in parallel the entire weight-coefficient memory 201.

Moreover, in embodiments based on spiking-neural-network models, the use of spiking neurons allows temporal parallelization between the layers of the neural network.

The architecture of the processor 100 according to certain embodiments allows some of the computations of the processing units 200 to be offloaded onto the processing modules 20 (pre-processor 203).

The specialization of the processor 100 for the computation of convolutional networks in addition allows the complexity of the connections to be decreased and the number of weight coefficients to be used and the number of neurons to be formed to be decreased. In a convolutional neural network (CNN) the weight coefficients represent a convolution filter and are shared by all the neurons of a layer. Thus, the number of weight coefficients is decreased. However, this sharing increases the complexity of the read logic of these weight coefficients.

In a convolutional layer the neurons are connected only to some of the input map. This partial connection to the inputs implies that an input spike will not affect all the neurons of the layer. Thus, there are neurons that cannot be triggered at the same time. These neurons may be collected together in the same processor without decreasing the parallel aspect of the processing (i.e. there is still the same number of neurons but fewer processors).

The processor 100 according to the embodiments of the invention may be used in many fields of application, in particular in applications in which a classification of data is used. The fields of application of the processor 100 according to the embodiments of the invention comprise, for example, video-surveillance applications with real-time recognition of people, interactive classification applications implemented in smartphones for interactive classification applications, data fusion applications in home surveillance systems, etc.

Those skilled in the art will understand that the convolution processing system according to the embodiments may be implemented in numerous ways by hardware, software or a combination of hardware and software, notably in the form of program code that may be distributed in the form of a program product, in numerous forms.

The processor 100 may be implemented in analogue or digital form.

In particular, the program code may be distributed using computer-readable media, which may include computer-readable storage media and communication media. The methods described in the present description may notably be implemented in the form of computer program instructions able to be executed by one or more processors in an information technology computer device. These computer program instructions may also be stored in a computer-readable medium.

The invention is not limited to the embodiments described hereinabove by way of non-limiting example. It encompasses all the variant embodiments that may be contemplated by the person skilled in the art. In particular, in certain embodiments, a resistive memory may be used to store the coefficients of the convolution kernels (weight coefficients). Moreover, the ALUs 2003 may be analogue. Moreover, the invention is not limited to one particular IN/OUT communication protocol. In certain embodiments, the processor may be devoid of post-processor. As a variant, the pre-processor and the post-processor may operate in a sequential mode. Although in the above embodiments the integrations of the neurons were all carried out in the processing units 200, as a variant, they may all be carried out externally to the processing units 200.

The invention claimed is:

1. A device for computing at least one convolution layer of a spiking convolutional neural network, in response to an input event,
    the convolutional neural network comprising at least one convolution kernel,
    the convolution kernel containing weight coefficients,
    wherein the device comprises at least one convolution module configured to compute said at least one convolution layer,
    each convolution module comprising a set of elementary computing units for computing the internal value of the convolution-layer neurons that are triggered by said input event,
    each convolution module being configured to map the weight coefficients of the kernel to at least some of the elementary computing units of the module in parallel,
    the number of elementary computing units being independent of the number of neurons of the convolution layer,
    wherein each convolution module comprises at least one neuron-value memory for storing neuron internal values computed by the elementary computing units and in that each convolution module is configured to compute, for each input event and for each elementary computing unit, one or more storage addresses for the neuron internal values computed by said computing unit in said neuron-value memory on the basis of the input event and of at least one parameter of the convolution layer to be processed,
    each elementary computing unit being able to select a storage address among said one or more storage addresses for storing the neuron internal values computed by said computing unit.

2. The device as claimed in claim 1, wherein for each input event, each computing unit is associated with a convolution-kernel weight coefficient, and in that each elementary computing unit is configured to compute the value of a set of independent neurons triggered by input events, depending on the weight coefficient associated with said elementary computing unit.

3. The device as claimed in claim 1, wherein each convolution module comprises at least one memory for storing the weight coefficients of at least one convolution kernel and in that said weight-coefficient memory is accessible in parallel by said elementary computing units.

4. The device as claimed in claim 3, wherein each convolution module comprises a routing unit that is configured to distribute the weight coefficients of the memory to the elementary computing units by means of a data bus comprising a set of lines for distributing the weight coefficients, and in that each convolution module is configured to compute addresses of the weight coefficients in said data bus to be assigned to the elementary computing units depending on the input event, the routing unit using the weight-coefficient addresses to distribute the weight coefficients of said memory to the elementary computing units.

5. The device as claimed in claim 1, wherein each convolution layer comprises at least one output map, each output map comprising a set of output neurons that are connected to input neurons of at least one portion of an input map of the neural network, the convolution kernel being represented by a convolution matrix in a coordinate system of given dimensions, the input event being defined by an input address in said coordinate system, said input address comprising the coordinates of the input event on the input map, and in that each elementary computing unit is associated with coordinates corresponding to the coordinates of the weight coefficient associated with said convolution matrix in said coordinate system, each elementary computing unit being able to select said storage address depending on the coordinates of said computing unit in said coordinate system.

6. The device as claimed in claim 5, wherein said parameters of the convolution layer comprise at least one parameter chosen from the size of the convolution matrix and the size of the output matrix.

7. The device as claimed in claim 1, wherein each convolution module comprises at least one neuron-value memory that is external to the elementary computing units.

8. The device as claimed in claim 1, wherein each convolution module comprises a neuron-value memory arranged in each elementary computing unit.

9. The device as claimed in claim 1, wherein each elementary computing unit is configured to compute the internal value of each neuron triggered by said input event using a computational neuron model associated with a nonlinear algebraic function.

10. The device as claimed in claim 9, wherein each computing unit comprises an arithmetic logic unit configured to compute an output value of a neuron by applying said function associated with the model.

11. The device as claimed in claim 1, wherein the internal value of a neuron computed by a given computing unit is the temporal integral of the input values received by said neuron, each input value being weighted by the weight coefficient associated with said computing unit for each input value of the neuron.

12. The device as claimed in claim 5, wherein each computing unit furthermore comprises an output unit that is configured to determine the output address on the output map of the triggered neurons and to communicate said output address to the other convolution modules of the device.

13. The device as claimed in claim 1, wherein the convolution modules are interconnected by an interconnect system.

14. The device as claimed in claim 1, wherein the number of elementary computing units is at least equal to the number of synaptic weights of the convolution kernel.

\* \* \* \* \*